(12) United States Patent
Arbuckle et al.

(10) Patent No.: US 12,457,420 B1
(45) Date of Patent: Oct. 28, 2025

(54) SYSTEMS AND METHODS FOR ADJUSTING A FIELD OF VIEW OF A VISION SYSTEM ON A MARINE VESSEL

(71) Applicant: Brunswick Corporation, Mettawa, IL (US)

(72) Inventors: Jason S. Arbuckle, Horicon, WI (US); Brandon L. Tate, Walnut Hill, IL (US); Trevor George, Savoy, IL (US)

(73) Assignee: Brunswick Corporation, Mettawa, IL (US)

( * ) Notice: Subject to any disclaimer, the term of this patent is extended or adjusted under 35 U.S.C. 154(b) by 96 days.

(21) Appl. No.: 18/432,849

(22) Filed: Feb. 5, 2024

(51) Int. Cl.
 *H04N 23/695* (2023.01)
 *B63B 79/15* (2020.01)
 *G06T 7/70* (2017.01)
 *H04N 13/239* (2018.01)

(52) U.S. Cl.
 CPC ........... *H04N 23/695* (2023.01); *B63B 79/15* (2020.01); *G06T 7/70* (2017.01); *H04N 13/239* (2018.05); *G06T 2207/10012* (2013.01)

(58) Field of Classification Search
 CPC .................................................. H04N 23/695
 USPC .......................................................... 348/46
 See application file for complete search history.

(56) References Cited

U.S. PATENT DOCUMENTS

| | | | |
|---|---|---|---|
| 5,515,287 A | 5/1996 | Hakoyama et al. |
| 6,234,100 B1 | 5/2001 | Fadeley et al. |
| 6,273,771 B1 | 8/2001 | Buckley et al. |
| 7,267,068 B2 | 9/2007 | Bradley et al. |
| 7,725,253 B2 | 5/2010 | Foxlin |
| 8,195,381 B2 | 6/2012 | Arvidsson |
| 8,622,778 B2 | 1/2014 | Tyers et al. |

(Continued)

FOREIGN PATENT DOCUMENTS

| CA | 2279165 | 1/2001 |
|---|---|---|
| CA | 2282064 | 1/2001 |

(Continued)

OTHER PUBLICATIONS

European Search Report for European Patent Application 19210025.3, dated Mar. 31, 2020.

(Continued)

*Primary Examiner* — Amir Shahnami
(74) *Attorney, Agent, or Firm* — Andrus Intellectual Property Law, LLP

(57) ABSTRACT

A system for adjusting a field of view (FOV) of a vision system on a marine vessel is provided, the system comprising: a camera is provided, the camera adjustably mounted to the marine vessel with an associated FOV of an environment of the marine vessel, and wherein the camera is associated with a three-dimensional camera coordinate system; and one or more hardware processors configured to: identify a trigger condition for adjusting the FOV of the camera; adjust a posture of the camera from an initial posture to an adjusted posture based on identification of the trigger condition, such that the camera has an adjusted FOV relative to the marine vessel; and determine three-dimensional location information associated with an object in the adjusted FOV in a three-dimensional global coordinate system associated with the marine vessel based on an adjusted transform between the camera coordinate system and the global coordinate system.

20 Claims, 12 Drawing Sheets

(56) References Cited

U.S. PATENT DOCUMENTS

| | | |
|---|---|---|
| 9,039,469 B1 | 5/2015 | Calamia et al. |
| 9,183,711 B2 | 11/2015 | Fiorini et al. |
| 9,355,463 B1 | 5/2016 | Arambel et al. |
| 9,615,006 B2 | 4/2017 | Terre et al. |
| 9,650,119 B2 | 5/2017 | Morikami et al. |
| 9,729,802 B2 | 8/2017 | Frank et al. |
| 9,734,583 B2 | 8/2017 | Walker et al. |
| 9,778,657 B2 | 10/2017 | Tyers |
| 9,878,769 B2 | 1/2018 | Kinoshita et al. |
| 9,908,605 B2 | 3/2018 | Hayashi et al. |
| 9,927,520 B1 | 3/2018 | Ward et al. |
| 9,988,134 B1 | 6/2018 | Gable et al. |
| 9,996,083 B2 | 6/2018 | Vojak |
| 10,037,701 B2 | 7/2018 | Harnett |
| 10,048,690 B1 | 8/2018 | Hilbert et al. |
| 10,055,648 B1 | 8/2018 | Grigsby et al. |
| 10,106,238 B2 | 10/2018 | Sidki et al. |
| 10,126,748 B2 | 11/2018 | Akuzawa |
| 10,191,153 B2 | 1/2019 | Gatland |
| 10,191,490 B2 | 1/2019 | Akuzawa et al. |
| 10,272,977 B2 | 4/2019 | Hashizume et al. |
| 10,281,917 B2 | 5/2019 | Tyers |
| 10,338,800 B2 | 7/2019 | Rivers et al. |
| 10,372,976 B2 | 8/2019 | Kollmann et al. |
| 10,429,845 B2 | 10/2019 | Arbuckle et al. |
| 10,431,099 B2 | 10/2019 | Stewart et al. |
| 10,444,349 B2 | 10/2019 | Gatland |
| 10,507,899 B2 | 12/2019 | Imamura et al. |
| 10,746,552 B2 | 8/2020 | Hashizume et al. |
| 11,198,494 B2 | 12/2021 | Derginer et al. |
| 11,702,178 B2 | 7/2023 | Dannenberg et al. |
| 2003/0137445 A1 | 7/2003 | Van Rees et al. |
| 2005/0075016 A1 | 4/2005 | Bertetti et al. |
| 2006/0058929 A1 | 3/2006 | Fossen et al. |
| 2007/0089660 A1 | 4/2007 | Bradley et al. |
| 2011/0153125 A1 | 6/2011 | Arbuckle et al. |
| 2011/0172858 A1 | 7/2011 | Gustin et al. |
| 2014/0316657 A1 | 10/2014 | Johnson et al. |
| 2015/0009325 A1 | 1/2015 | Kardashov |
| 2015/0032305 A1 | 1/2015 | Lindeborg |
| 2015/0089427 A1 | 3/2015 | Akuzawa |
| 2015/0134146 A1 | 5/2015 | Pack et al. |
| 2015/0172545 A1 | 6/2015 | Szabo et al. |
| 2015/0276923 A1 | 10/2015 | Song et al. |
| 2015/0288891 A1 | 10/2015 | Johansson et al. |
| 2015/0294660 A1 | 10/2015 | Stokes et al. |
| 2015/0375837 A1 | 12/2015 | Johnson et al. |
| 2015/0378361 A1 | 12/2015 | Walker et al. |
| 2016/0041039 A1 | 2/2016 | Olsson |
| 2016/0069681 A1 | 3/2016 | Johnson et al. |
| 2016/0070265 A1 | 3/2016 | Liu et al. |
| 2016/0125739 A1 | 5/2016 | Stewart et al. |
| 2016/0162145 A1 | 6/2016 | Rivers et al. |
| 2016/0187140 A1 | 6/2016 | Clarke et al. |
| 2016/0196653 A1 | 7/2016 | Grant et al. |
| 2016/0214534 A1 | 7/2016 | Richards et al. |
| 2016/0320190 A1 | 11/2016 | Wu et al. |
| 2016/0334794 A1 | 11/2016 | Johnson et al. |
| 2016/0370187 A1 | 12/2016 | Gatland et al. |
| 2017/0052029 A1 | 2/2017 | Ninomiya et al. |
| 2017/0059705 A1 | 3/2017 | Stokes et al. |
| 2017/0064238 A1 | 3/2017 | Kardashov |
| 2017/0090021 A1 | 3/2017 | Sayer et al. |
| 2017/0146642 A1 | 5/2017 | Stokes et al. |
| 2017/0167871 A1 | 6/2017 | Johnson et al. |
| 2017/0168159 A1 | 6/2017 | Gatland |
| 2017/0176586 A1* | 6/2017 | Johnson .................. G01S 7/20 |
| 2017/0184414 A1 | 6/2017 | Johnson et al. |
| 2017/0205829 A1 | 7/2017 | Tyers |
| 2017/0227639 A1 | 8/2017 | Stokes et al. |
| 2017/0243360 A1 | 8/2017 | Schulte |
| 2017/0253314 A1 | 9/2017 | Ward |
| 2017/0277189 A1 | 9/2017 | Johnson et al. |
| 2017/0285134 A1 | 10/2017 | Stokes et al. |
| 2017/0300056 A1 | 10/2017 | Johnson et al. |
| 2017/0365175 A1 | 12/2017 | Harnett |
| 2017/0371348 A1 | 12/2017 | Mou |
| 2018/0023954 A1 | 1/2018 | Rivers |
| 2018/0050772 A1 | 2/2018 | Koyano et al. |
| 2018/0057132 A1 | 3/2018 | Ward et al. |
| 2018/0081054 A1 | 3/2018 | Rudzinsky et al. |
| 2018/0259338 A1 | 9/2018 | Stokes et al. |
| 2018/0259339 A1 | 9/2018 | Johnson et al. |
| 2018/0292529 A1 | 10/2018 | Hogasten |
| 2019/0098212 A1 | 3/2019 | Shain et al. |
| 2019/0137618 A1 | 5/2019 | Hawker |
| 2019/0251356 A1 | 8/2019 | Rivers |
| 2019/0258258 A1 | 8/2019 | Tyers |
| 2019/0283855 A1 | 9/2019 | Nilsson |
| 2019/0299983 A1 | 10/2019 | Shalev-Shwartz et al. |

FOREIGN PATENT DOCUMENTS

| | | |
|---|---|---|
| DE | 112013004908 | 6/2015 |
| EP | 1775212 | 4/2007 |
| EP | 1873052 | 1/2008 |
| EP | 3182155 | 6/2017 |
| EP | 2824528 | 3/2019 |
| JP | 7-246998 | 10/1999 |
| JP | 2016049903 | 4/2016 |
| JP | 2017178242 | 10/2017 |
| KR | 20140011245 | 1/2014 |
| WO | WO 9305406 | 3/1993 |
| WO | WO 2006040785 | 4/2006 |
| WO | WO 2006062416 | 6/2006 |
| WO | WO 2008066422 | 6/2008 |
| WO | WO 2012010818 | 1/2012 |
| WO | WO 2017095235 | 6/2017 |
| WO | WO 2017167905 | 10/2017 |
| WO | WO 2017168234 | 10/2017 |
| WO | WO 2017205829 | 11/2017 |
| WO | WO 2018162933 | 9/2018 |
| WO | WO 2018183777 | 10/2018 |
| WO | WO 2018201097 | 11/2018 |
| WO | WO 2018232376 | 12/2018 |
| WO | WO 2018232377 | 12/2018 |
| WO | WO 2019011451 | 1/2019 |
| WO | WO 2019096401 | 5/2019 |
| WO | WO 2019126755 | 6/2019 |
| WO | WO 2019157400 | 8/2019 |
| WO | WO 2019201945 | 10/2019 |

OTHER PUBLICATIONS

John Bayless, Adaptive Control of Joystick Steering in Recreational Boats, Marquette University, Aug. 2017, https://epublications.marquette.edu/cgi/viewcontent.cgi?article=1439&context=theses_open.

W. Xu et al., "Internet of Vehicles in Big Data Era." in IEEE/CAA Journal of Automatica Sinica, vol. 5, No. 1, pp. 19-35, Jan. 2018, doi: 10.1109/JAS.2017.7510736.

Gonzalez-Reolid et al., "An Autonomous Solar-Powered Marine Robitic Ibservatory for Permanent Monitoring of Large Areas of Shallow Water", Sensors 2018, 18(10), 3497; https://doi.org/10.3390/s18103497.

S. Reed and V.E. Schmidt, "Providing Nautical Chart Awareness to Autonomous Surface Vessel operations," Oceans 2016 MTS/IEEE Monterery, 2016, pp. 1-8, doi: 10.1109/Oceans.2016.7761472.

Systems and Methods for Controlling Convertible Bimini Tops for Marine Vessels, , Farrell et al., U.S. Appl. No. 17/711,224, filed Apr. 1, 2022.

Navigation Control System and Method for a Marine Vessel, Singh et al., U.S. Appl. No. 17/944,410, filed Sep. 14, 2022.

* cited by examiner

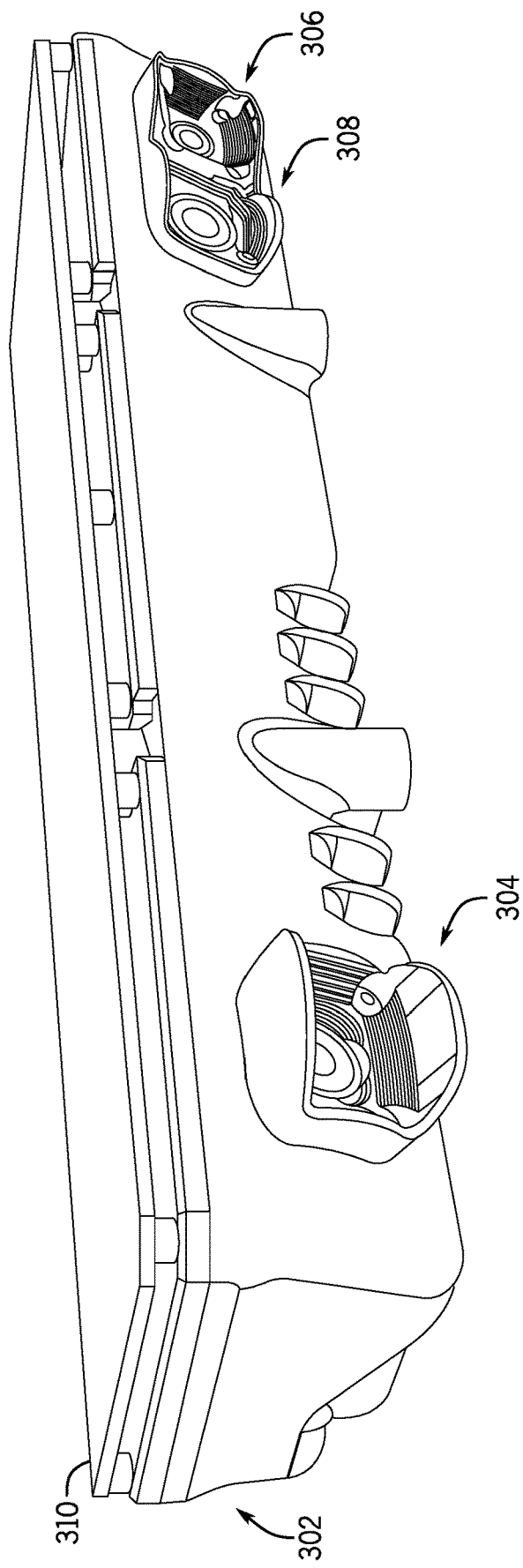
FIG. 3A1

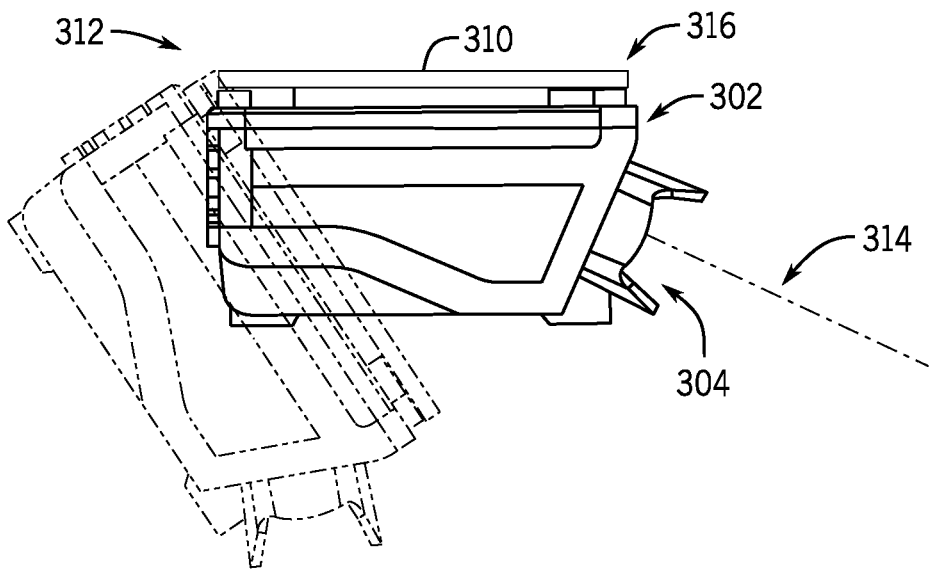
FIG. 3A2
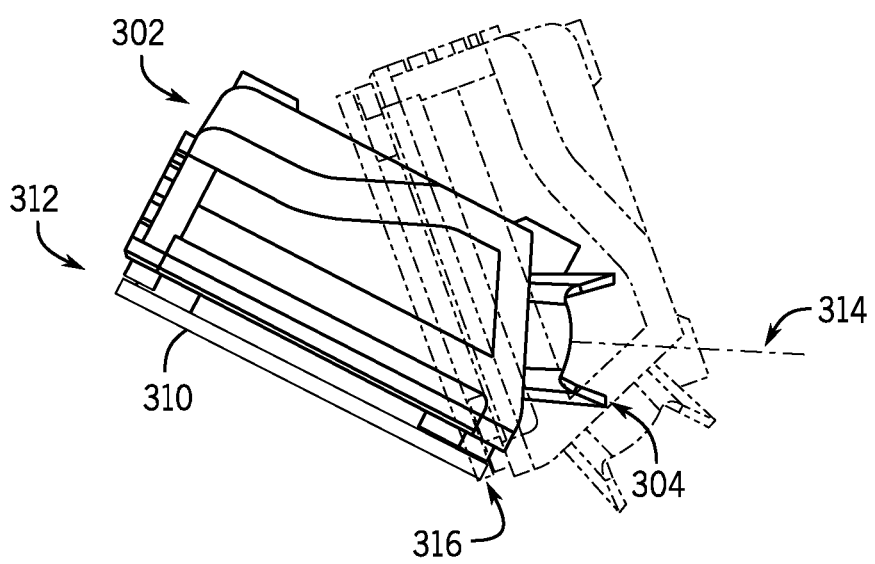
FIG. 3A3

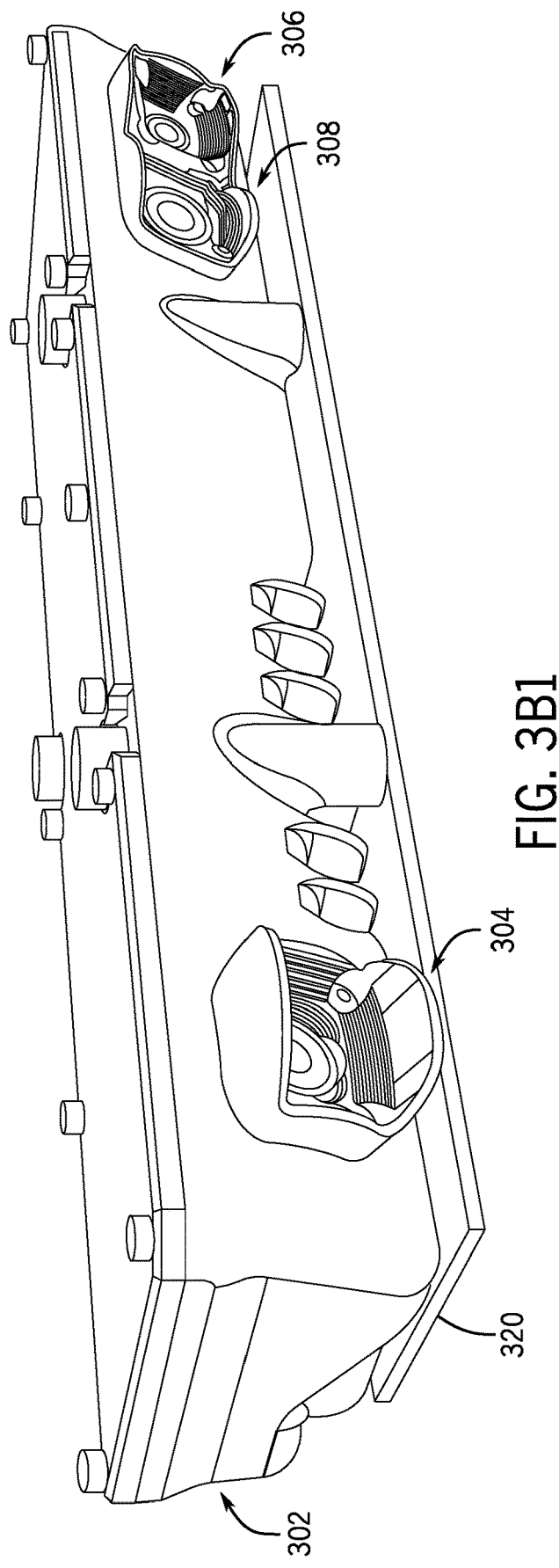
FIG. 3B1

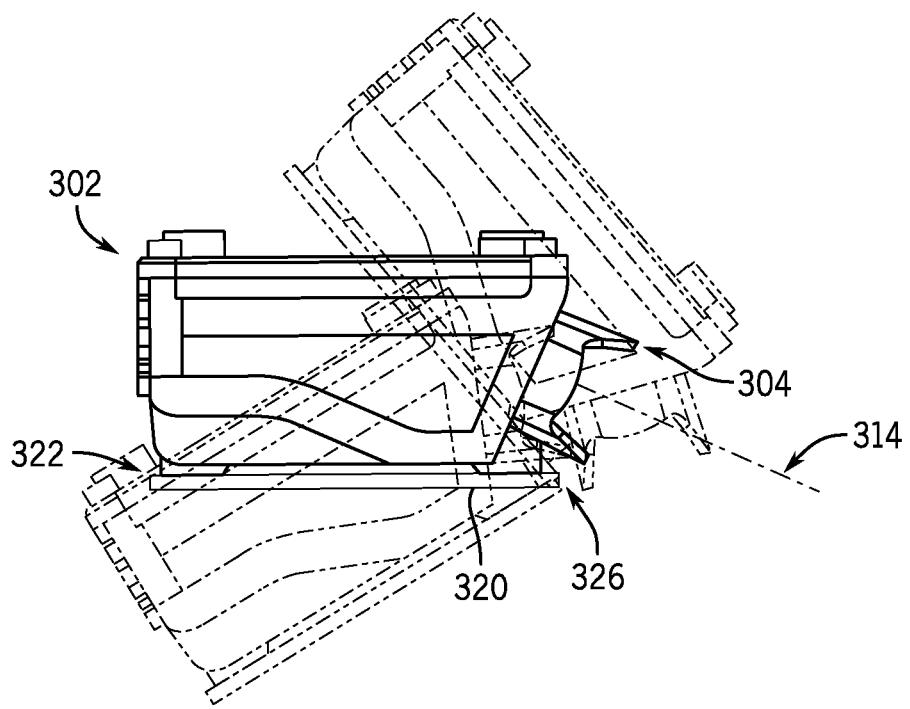
FIG. 3B2
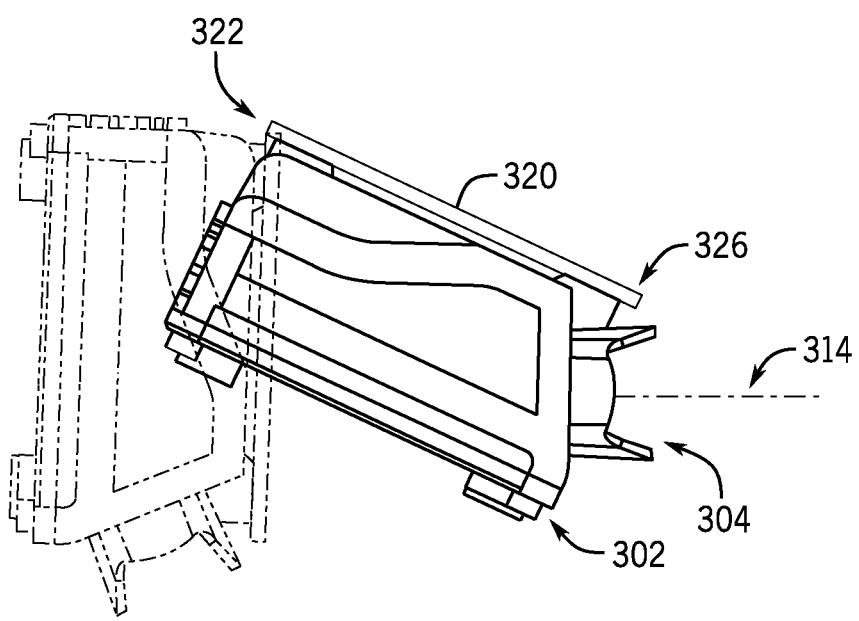
FIG. 3B3

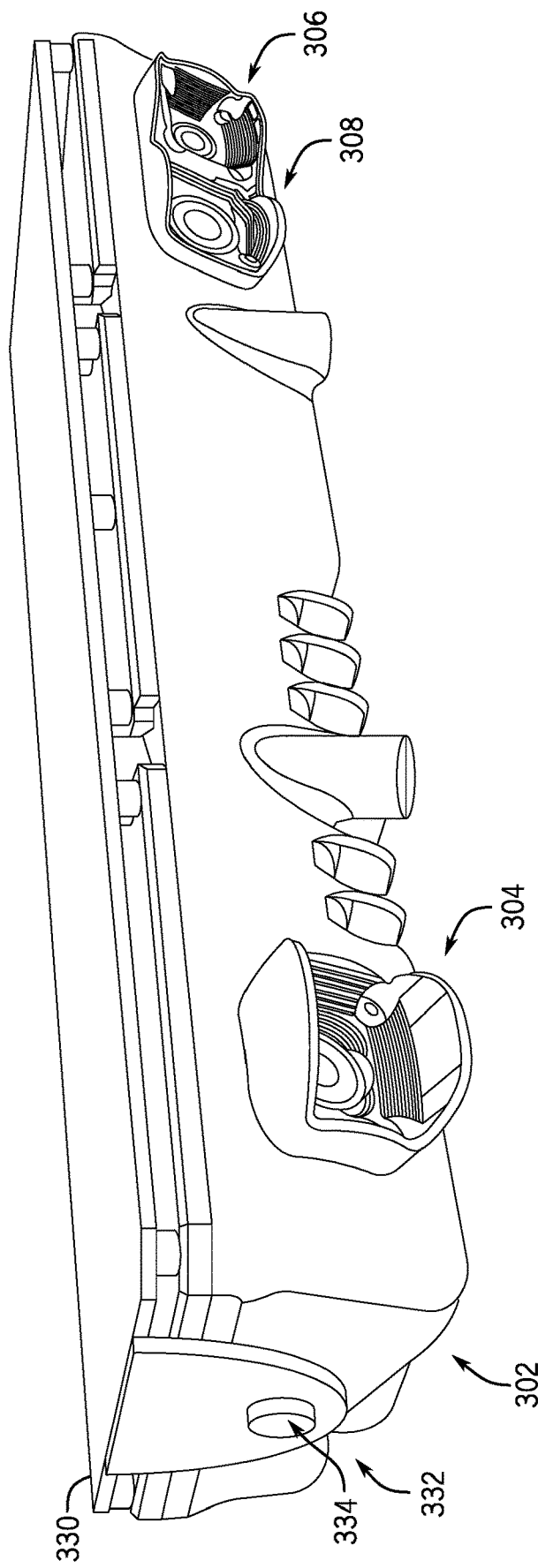
FIG. 3C1

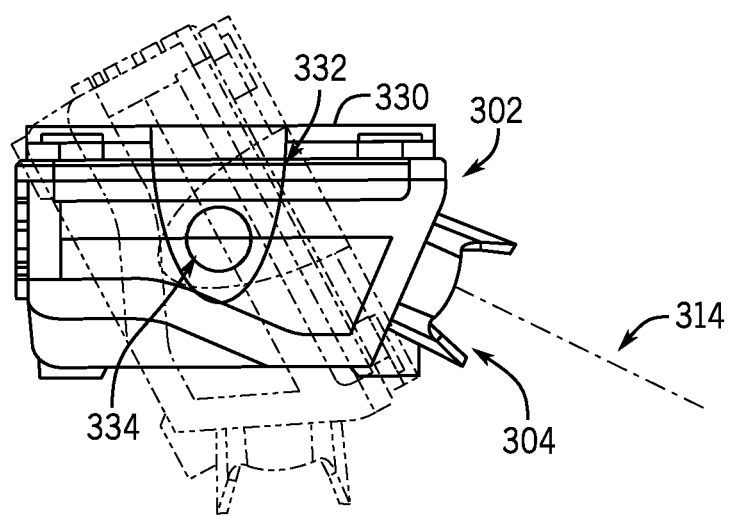
FIG. 3C2
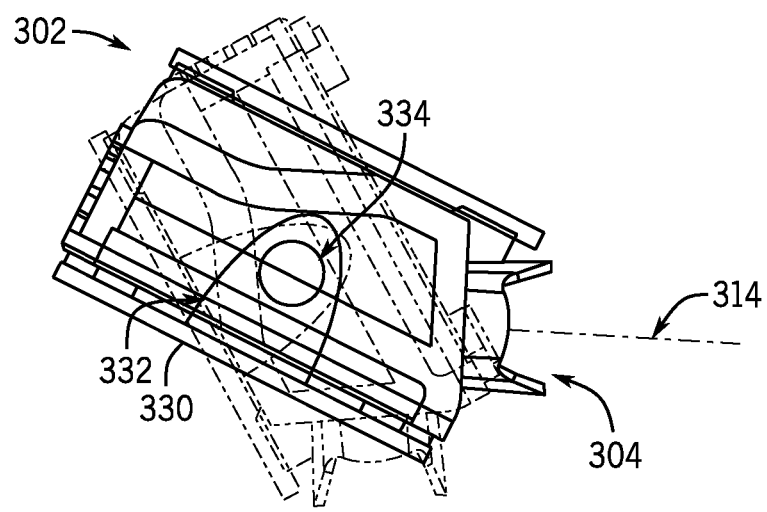
FIG. 3C3

SYSTEMS AND METHODS FOR ADJUSTING A FIELD OF VIEW OF A VISION SYSTEM ON A MARINE VESSEL

FIELD

The present disclosure generally relates to systems and methods for adjusting a field of view of a vision system on a marine vessel.

BACKGROUND

The following U.S. Patents are incorporated herein by reference, in entirety:

U.S. Pat. No. 10,372,976 discloses an object detection system for a marine vessel having at least one marine drive includes at least one image sensor positioned on the marine vessel and configured to capture an image of a marine environment on or around the marine vessel, and a processor. The object detection system further includes an image scanning module executable on the processor that receives the image as input. The image scanning module includes an artificial neural network trained to detect patterns within the image of the marine environment associated with one or more predefined objects, and to output detection information regarding a presence or absence of the one or more predefined objects within the image of the marine environment.

U.S. Pat. No. 10,429,845 discloses a system that controls a position of a marine vessel near an object, the marine vessel being movable with respect to first, second, and third axes that are perpendicular to one another and define six degrees of freedom of potential vessel movement. The system includes a location sensor that measures a present location of the marine vessel and a heading sensor that determines a present heading of the marine vessel. A control module is in signal communication with the location sensor and the heading sensor. A marine propulsion system is in signal communication with the control module. The control module determines marine vessel movements that are required to translate the marine vessel from the present location to the target location and to rotate the marine vessel from the present heading to the target heading. The control module controls the propulsion system to produce components of the required marine vessel movements no more than two degrees of freedom at a time during a given iteration of control.

U.S. Pat. No. 11,198,494 discloses a propulsion control system for a marine vessel includes a plurality of propulsion devices steerable to propel the marine vessel, at least one proximity sensor that determines a relative position of the marine vessel with respect to an object, wherein the at least one proximity sensor has a field of view (FOV). A controller is configured to identify a trigger condition for expanding the FOV of the at least one proximity sensor and control thrust and/or steering position of at least one of the plurality of propulsion devices to expand the FOV of the at least one proximity sensor by inducing a roll movement or a pitch movement of the marine vessel.

U.S. Pat. No. 11,436,927 discloses a system for proximity sensing on a marine vessel includes a main inertial measurement unit (IMU) positioned on the marine vessel at a main installation attitude and a main location, a first proximity sensor configured to measure proximity of objects from a first sensor location on the marine vessel, and a first sensor IMU positioned on the marine vessel at the first sensor location and at a first installation attitude. A sensor processor is configured to receive main IMU data from the main IMU and first IMU data from the first sensor IMU, wherein the main location of the main IMU on the marine vessel is known and at least one of the first sensor location and first installation attitude of the first sensor IMU on the marine vessel are initially unknown. The sensor processor determines a relative orientation transform between the main installation attitude and the first installation attitude by comparing the main IMU data and the first IMU data, and then determines a relative position transform between the main location and the first sensor location based on the relative orientation transform and comparison of the main IMU data and the first IMU data.

U.S. Pat. No. 11,702,178 discloses a marine propulsion system includes at least one propulsion device and a user input device configured to facilitate input for engaging automatic propulsion control functionality with respect to a docking surface, wherein the user input device includes a direction indicator display configured to visually indicate a direction with respect to the marine vessel. A controller is configured to identify a potential docking surface, determine a direction of the potential docking surface with respect to the marine vessel, and control the direction indicator display to indicate the direction of the potential docking surface with respect to the marine vessel. When a user selection is received via the user input device to select the potential docking surface as a selected docking surface, and propulsion of the marine vessel is automatically controlled by controlling the at least one propulsion device to move the marine vessel with respect to the selected docking surface.

U.S. patent application Ser. No. 17/711,224 discloses convertible bimini top systems for a marine vessel having a deck and being situated in a body of water. The disclosed convertible bimini top system comprises a bimini top having a cover configured to extend over the deck, an actuator configured to raise and lower the cover relative to the deck, a controller communicatively coupled to the actuator, the controller being configured to operate the actuator to raise and lower the cover relative to the deck, and a sensor communicatively coupled to the controller, the sensor being configured to sense an obstruction proximate to the marine vessel. The controller is configured to automatically operate the actuator to lower the cover when the sensor senses the obstruction proximate to the marine vessel.

U.S. patent application Ser. No. 17/944,410 discloses a navigation system for a marine vessel comprises a ranging sensor and a control system. The ranging sensor is arranged to image an area around the marine vessel, such as an area forward of the bow, and generate ranging data. The control system is configured to receive ranging data from the ranging sensor, detect a navigable opening based on the ranging data, determine a height of the navigable opening, determine whether the marine vessel can safely navigate through the navigable opening based on the height of the navigable opening, and generate a navigation action based on whether the marine vessel can navigate through the navigable opening.

SUMMARY

In accordance with some embodiments of the disclosed subject matter, a system for adjusting a field of view (FOV) of a vision system on a marine vessel is provided, the system comprising: a camera, wherein the camera is configured to be adjustably mounted to the marine vessel with an associated FOV of an environment of the marine vessel, and wherein the camera is associated with a three-dimensional camera coordinate system; and one or more hardware processors configured to: identify a trigger condition for adjusting the FOV of the camera; adjust a posture of the camera from an initial posture to an adjusted posture based on identification of the trigger condition, such that the camera has an adjusted FOV relative to the marine vessel; and determine three-dimensional location information associated with an object in the adjusted FOV in a three-dimensional global coordinate system associated with the marine vessel based on an adjusted transform between the camera coordinate system and the global coordinate system.

In some embodiments, the one or more hardware processors are further configured to: receive, while the camera is in the adjusted posture, image data captured by the camera; determine three-dimensional location information associated with the object in the camera coordinate system; and determine the three-dimensional location information associated with the object in the three-dimensional global coordinate system associated with the marine vessel using the adjusted transform and the three-dimensional location information associated with the object in the camera coordinate system.

In some embodiments, the one or more hardware processors are further configured to: receive, while the camera is in the initial posture with an initial FOV, image data captured by the camera; determine three-dimensional location information associated with one or more objects in the initial FOV in the camera coordinate system based on the image data captured while the camera is in the initial posture; and determine three-dimensional location information associated with the one or more objects in the three-dimensional global coordinate system using an initial transform and the three-dimensional location information associated with the one or more objects in the camera coordinate system.

In some embodiments, the one or more hardware processors are further configured to: determine the adjusted transform based on an initial transform between the camera coordinate system and the global coordinate system and information indicative of a change in FOV of the camera between the initial posture and the adjusted posture, wherein the initial transform is associated with the initial posture.

In some embodiments, the one or more hardware processors are further configured to: receive, from one or more sensors, information indicative of a tilt angle of the camera in the adjusted posture, wherein the information indicative of the change in FOV of the camera comprises a tilt angle of the camera in the adjusted posture.

In some embodiments, the one or more hardware processors are further configured to: adjust a tilt angle of the camera about a horizontal axis, such that the posture of the camera is adjusted from the initial position to the adjusted position, wherein the horizontal axis is orthogonal to a depth axis of the camera. In some embodiments, the system further comprises: a sensor mechanically coupled to the camera, wherein the sensor is configured to output a value indicative of a tilt angle of the camera about a horizontal axis, and wherein the one or more hardware processors are further configured to: receive, from the sensor, the value indicative of the tilt angle of the camera about the horizontal axis.

In some embodiments, the system further comprises: a rotatable mounting bracket mechanically coupled to the camera.

In some embodiments, the system further comprises: a motor mechanically coupled to the rotatable mounting bracket, wherein the one or more hardware processors are further configured to: in response to identification of the trigger condition, drive the motor, thereby causing rotation of the rotatable mounting bracket about an axis such that the camera is adjusted from the initial posture to the adjusted posture.

In some embodiments, the axis is aligned with an edge of the camera, and is orthogonal to a depth axis of the camera.

In some embodiments, the axis is a center axis of the camera, and is orthogonal to a depth axis of the camera.

In some embodiments, the trigger condition is one trigger condition of a plurality of trigger conditions, each of the plurality of trigger conditions is associated with a respective camera posture.

In some embodiments, the plurality of trigger conditions comprises a first trigger condition corresponding to a determination that the marine vessel is docking, and wherein the first trigger condition is associated with a camera posture tilted down at a first angle, such that a blind spot between a hull of the marine vessel and an edge of the FOV is minimized.

In some embodiments, the plurality of trigger conditions comprises a second trigger condition corresponding to a determination that the marine vessel is on plane, and wherein the second trigger condition is associated with a camera posture tilted at a second angle, such that a depth axis of the camera is substantially parallel to a horizontal axis of the marine vessel.

In some embodiments, the plurality of trigger conditions comprises a third trigger condition corresponding to a determination that the marine vessel is expected to travel under an overhead structure, and wherein the third trigger condition is associated with a camera posture tilted up at a third angle, such that at least a portion of an underside of the overhead structure is expected to be within the FOV.

In some embodiments, the plurality of trigger conditions comprises a fourth trigger condition corresponding to a determination that an interior of the marine vessel is to be monitored, and wherein the fourth trigger condition is associated with a camera posture tilted at a fourth angle, such that at least a portion of an area from which an operation console of the marine vessel is accessible is within the FOV.

In some embodiments, the camera comprises a stereoscopic camera.

In accordance with some embodiments of the disclosed subject matter, a method for adjusting a field of view (FOV) of a vision system on a marine vessel is provided, comprising: identifying a trigger condition for adjusting the FOV of a camera, wherein the camera is configured to be adjustably mounted to the marine vessel with an associated FOV of an environment of the marine vessel, and wherein the camera is associated with a three-dimensional camera coordinate system; adjusting a posture of the camera from an initial posture to an adjusted posture based on identification of the trigger condition, such that the camera has an adjusted FOV relative to the marine vessel; and determining three-dimensional location information associated with an object in the adjusted FOV in a three-dimensional global coordinate system associated with the marine vessel based on an adjusted transform between the camera coordinate system and the global coordinate system.

BRIEF DESCRIPTION OF THE DRAWINGS

The present disclosure is described with reference to the following drawings.

FIG. 3A1 shows an example of a sensor device coupled to an adjustable sensor mount device to rotate via a first side in accordance with some embodiments of the disclosure.

FIG. 3A2 shows an example of the sensor device coupled to an adjustable sensor mount device to rotate via the first side in a first orientation in accordance with some embodiments of the disclosure.

FIG. 3A3 shows an example of the sensor device coupled to an adjustable sensor mount device to rotate via the first side in a second orientation in accordance with some embodiments of the disclosure.

FIG. 3B1 shows an example of the sensor device coupled to an adjustable sensor mount device to rotate via a second side in accordance with some embodiments of the disclosure.

FIG. 3B2 shows an example of the sensor device coupled to an adjustable sensor mount device to rotate via the second side in a first orientation in accordance with some embodiments of the disclosure.

FIG. 3B3 shows an example of the sensor device coupled to an adjustable sensor mount device to rotate via the second side in a second orientation in accordance with some embodiments of the disclosure.

FIG. 3C1 shows an example of the sensor device coupled to an adjustable sensor mount device to rotate around a central axis in accordance with some embodiments of the disclosure.

FIG. 3C2 shows an example of the sensor device coupled to an adjustable sensor mount device to rotate around the central axis in a first orientation in accordance with some embodiments of the disclosure.

FIG. 3C3 shows an example of the sensor device coupled to an adjustable sensor mount device to rotate around the central axis in a second orientation in accordance with some embodiments of the disclosure.

FIG. 6F shows an example of a partial field of view of a vision system of a marine vessel adjusted to a neutral position in accordance with some embodiments of the disclosure.

DETAILED DESCRIPTION

Currently, sensors used for marine autonomy generally have a limited size, and a fixed field of view (FOV). Such sensors are typically mounted in a fixed position so that the FOV is maximized for one or more applications of that utilize data from the autonomy system. This limitation can drive the need for additional sensors for new applications, or to provide sufficient coverage of the environment under certain situations that the autonomy system was previously not configured to perform. For example, sensors optimized with a FOV for an auto-dock application are likely to be biased towards near vessel perception, which can be expected to limit the horizontal distance that can be perceived by those sensors. As another example, sensors optimized with a FOV for an on-plane application where the vessel velocities are higher are likely to biased toward more distant perception, as objects that are farther away can be expected to be out of a FOV of sensors optimized for a low speed autonomous docking application. In such an example, having a FOV that is biased for more distant perception can facilitate earlier detection of distant objects moving relatively quickly with respect to the marine vessel, allowing more reaction time for the autonomy system and/or an operator of the marine vessel to avoid a collision.

In some embodiments, mechanisms described herein can facilitate adjusting a FOV of one or more sensors of a vision system of a marine vessel under certain operating conditions. In some embodiments, during operations in which a marine vessel navigates relatively close to one or more objects (e.g., during low speed operation in a crowded environment and/or during docking operations), mechanisms described herein can adjust a FOV of one or more sensors to include more of an area near the marine vessel. Additionally or alternatively, during operations in which more distant objects from the marine vessel are likely to present a greater risk of collision with the marine vessel (e.g., during higher speed operation, while the vessel is anchored), mechanisms described herein can adjust a FOV of one or more sensors to include more of an area far from the marine vessel.

Figure 1:
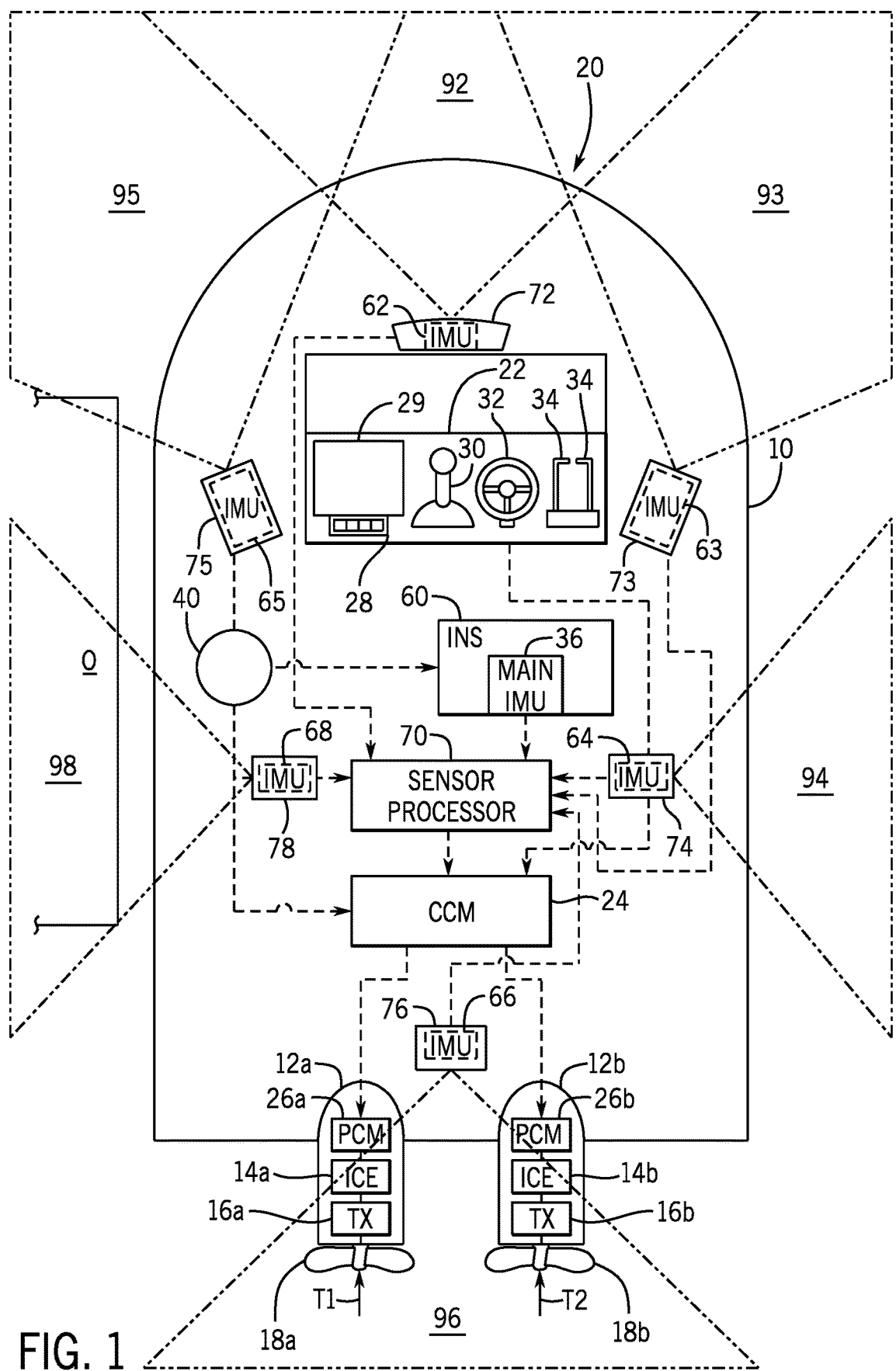
FIG. 1 shows an example of a propulsion system on a marine vessel in accordance with some embodiments of the disclosure.

FIG. 1 shows an example of a schematic representation of a propulsion system on a marine vessel in accordance with some embodiments of the disclosed subject matter. FIG. 1 shows a marine vessel 10 equipped with a propulsion system 20 on marine vessel 10 configured in accordance with some embodiments of the disclosed subject matter. In some embodiments, propulsion system 20 can be configured to operate, for example, in a joysticking mode in which a joystick is operated by a user to control vessel movement within an x/y plane, among other modes (e.g., as described hereinbelow). In some embodiments, propulsion system 20 can include first and second propulsion devices 12a, 12b that produce first and second thrusts T1, T2 to propel the vessel 10. First and second propulsion devices 12a, 12b are illustrated as outboard motors, but can alternatively be inboard motors, stem drives, jet drives, pod drives, any other suitable propulsion device, or combinations thereof. Each propulsion device can be provided with an engine 14a, 14b operatively connected to a transmission 16a, 16b, in turn, operatively connected to a propeller 18a, 18b.

In some embodiments, vessel 10 can also house various control elements that comprise part of the marine propulsion system 20. For example, marine propulsion system 20 can comprise an operation console 22 in signal communication, for example via a controller area network (CAN) bus (e.g., as described in U.S. Pat. No. 6,273,771), with a controller 24, such as for example a command control module (CCM), and with propulsion control modules (PCM) 26a, 26b associated with the respective propulsion devices 12a, 12b. Each of controller 24 and PCMs 26a, 26b can include memory and a programmable processor. Each control module 24, 26a, 26b can include one or more processors communicatively connected to a respective storage system comprising a computer-readable medium that includes volatile and/or nonvolatile memory upon which computer-readable code and data can be stored. Additionally or alternatively, in some embodiments, a processor(s) of one or more of control modules 24, 26a, 26b can be communicatively connected to a shared storage system comprising a computer-readable medium that includes volatile and/or nonvolatile memory upon which computer-readable code and data can be stored. In some embodiments, each processor can access computer-readable code and, upon executing the code, carry out one or more functions, such as vision system field of view adjustment functions, as described in detail below.

Note that although mechanisms described herein are generally described in connection with an internal combustion engine (ICE) propulsion system that includes a powerhead implemented using an ICE engine, mechanisms described herein can be used in connection with a propulsion system that includes any other suitable powerhead, such as one or more electric motors, or any suitable combination of powerheads. For example, propulsion devices 12a, 12b can be replaced by, or used in combination with, one or more propulsion devices that produce thrust to propel vessel 10 using an electric motor, such as an electric outboard motor, electric inboard motor, electric stern drive, electric jet drive, electric pod drive, any other suitable propulsion device, or combinations thereof, that is implemented using an electric motor (e.g., including a motor that is directly connected to a propulsor shaft without a transmission, such as transmission 16a, 16b).

In some embodiments, operation console 22 can include any suitable number of user input devices, such as, a keypad 28, a joystick 30, a steering wheel 32, one or more throttle/shift levers 34, etc., and any suitable number of output devices, such as a display 29, a heads-up display (not shown), one or more speakers (not shown), etc. In some embodiments, each of the input devices can be configured to input commands to controller 24, which can, in turn, communicate control instructions to first and second propulsion devices 12a, 12b by communicating with PCMs 26a, 26b. In some embodiments, steering wheel 32 and throttle/shift lever(s) 34 can function in a conventional manner, such that rotation of steering wheel 32, for example, activates a transducer that provides a signal to controller 24 regarding a desired direction of the vessel 10. Controller 24 can, in turn, send signals to PCMs 26a, 26b (and/or thrust vector module(s) (TVMs), or additional modules if provided), which in turn can activate steering actuators to achieve desired orientations of the propulsion devices 12a, 12b. In some embodiments, propulsion devices 12a, 12b can be independently steerable about a respective steering axis. Throttle/shift lever(s) 34 can send signals to controller 24 regarding the desired gear (e.g., forward, reverse, or neutral) of transmissions 16a, 16b and desired rotational speed of engines 14a, 14b of propulsion devices 12a, 12b. Controller 24 can, in turn, send signals to PCMs 26a, 26b, which in turn activate electromechanical actuators in transmissions 16a, 16b and engines 14a, 14b for shift and throttle, respectively. A manually operable input device, such as joystick 30, can also be used to provide signals to controller 24. In some embodiments, joystick 30 can be used to allow an operator of vessel 10 to manually maneuver vessel 10, such as to achieve lateral translation or rotation of vessel 10.

In some embodiments, output devices, such as display 29, speakers, etc., can be configured to present (e.g., visually, audibly, etc.) any suitable data, information, image data (e.g., images captured by one or more devices that include an image sensor(s)), received from controller 24, from another controller and/or another processor, and/or generated based on data and/or information received from controller 24, another controller, and/or another processor. In some embodiments, display 29 can be any suitable display, such as a multi-function display (MFD). In some embodiments, display 29 can be used to present a user interface, which can be implemented as a touchscreen or display that is capable of receiving input via a touchscreen. In some embodiments, one or more other input devices can be used to interact with a user interface (e.g., a graphical user interface) presented by display 29, such as a keypad (e.g., keypad 28), a keyboard, a track ball, a track pad, any other suitable user input device, and/or suitable combination of user input devices. In some embodiments, vessel 10 can include multiple displays 29, which can be integrated into operation console 22, integrated into another portion of vessel 10, and/or mechanically mounted to operation console 22 or another portion of vessel 10. In some embodiments, display 29 can be used to present menus, operational data (e.g., throttle, speed, heading, engine output, etc.), maps, charts, settings that can be used to configure another display (e.g., a HUD, another MFD), etc.

In some embodiments, propulsion system 20 can also include one or more depth sensors 72, 73, 74, 75, 76, and 78. In some embodiments, depth sensors 72-78 can form a portion of a vision system associated with vessel 10 (although the vision system may be configured to use sensing modes other than visible light, such as sound-based sensing, radio-based sensing, infrared-based sensing, etc.). Although a limited number of depth sensors are shown (e.g., one perpendicular to each of the bow, stern, and port and starboard sides of vessel 10, and two positioned at an angle between the bow and sides), fewer or more sensors can be provided at each location and/or provided at other locations, such as on a hardtop of vessel 10. In some embodiments, depth sensors 72-78 can be used to determine a three-dimensional location of an object and/or other feature of an environment (e.g., a water surface) that is within a field of view (e.g., partial FOVs 92, 93, 94, 95, 96, and 98 shown in FIG. 1, associated with depth sensors 72, 73, 74, 75, 76, and 78 respectively) of the depth sensor with respect to the location of the depth sensor (e.g., distance to various points on an object and a direction associated with each of the various points). For example, depth sensors 72-78 can be implemented using one or more depth cameras (e.g., implemented using stereoscopic imaging techniques, structured light imaging techniques, continuous-wave time-of-flight imaging techniques, direct time-of-flight imaging techniques, etc.), three-dimensional laser range finders (e.g., implemented using light detection and ranging (lidar) techniques), radars, sonars, and/or other devices individually capable of determining both the distance and direction to points on an object and/or other feature relatively accurately (e.g., on the order of several to tens of centimeters (cm) at relatively close ranges on the order of several to tens of meters, such as an accuracy of about +/−3 cm at 5 meters (m) and +/−13 cm at 10 m for stereoscopic cameras), e.g., the relative position of various points on an object O (such as a dock, a seawall, a slip, another vessel, a person, a portion of a bridge, a portion of a dam, a relatively large rock, a tree, etc.) with respect to each sensor 72-78 having a field of view that includes object O. In some embodiments, a 3D location of object O and/or various points on object O with respect to vessel 10 can be determined (e.g., by a sensor processor 70) using the location of object O and/or various points on object O determined by one or more of depth sensors 72-78. Additionally, in some embodiments, a 3D location of points of vessel 10 that fall within a sensor FOV can be determined (e.g., by sensor processor 70) using the location of points on vessel 10 determined by one or more of depth sensors 72-78. In some embodiments, a calibration process can be performed to determine a set of transforms that can be used to convert a location from a local coordinate system used by a particular depth sensor (sometimes referred to herein as a camera coordinate system, although it can be a coordinate system used by another type of depth sensor, such as a lidar or sonar-based sensor) to the corresponding location in a global coordinate system used by vessel 10 (e.g., used to perform autonomous navigation processes, such as automatically guiding vessel 10 during docking, automatically guiding vessel 10 during trailer loading or unloading, automatically avoiding collisions with objects via a virtual buffer zone, autonomous navigation through areas that include other vessels and/or other obstacles, etc.). The camera coordinate system can define a local reference frame for a particular camera (or other type of depth sensor), and the global coordinate system can define a reference frame to which each camera (or other type of depth sensor) is calibrated, which can be referred to as a common reference frame, a global reference frame, or a world reference frame (note that the global coordinate system can be independent and distinct from the geographical coordinate system of latitude and longitude often used to designate locations on Earth).

In some embodiments, a camera coordinate system can be defined relative to a center of an imaging plane (e.g., with an origin at a center of the imaging plane, a depth axis extending perpendicular to the imaging plane, and lateral axes extending perpendicular to the depth axis) of the camera. In some embodiments, the camera coordinate system can use any suitable type of coordinate system, such as a 3D Cartesian coordinate system, a spherical coordinate system, a cylindrical coordinate system, etc. Note that the type of coordinate system used to define the camera coordinate system can vary based on the type of sensor being used. For example, depth cameras can use a Cartesian coordinate system that defines a depth axis (e.g., a z-axis) that extends perpendicular to the imaging plane of the camera (e.g., an imaging plane associated with an image sensor of the camera), and lateral coordinates (e.g., an x-axis and a y-axis) that extend parallel to the imaging plane and can be used to define the horizontal and vertical distance of a point from an optical axis of the camera. As another example, a scanning lidar that sweeps across a scene using a laser line or single laser point can use a cylindrical coordinate system that defines a depth axis (e.g., an r-axis) that extends perpendicular to the light detector(s) (e.g., an imaging plane associated with an area sensor, an imaging axis of a line sensor), and lateral coordinates (e.g., a z-axis and a θ coordinate) that can be used to define the angular distance (e.g., in degrees or radians) and vertical distance of a point from reference axes of the lidar system.

In some embodiments, a global coordinate system (sometimes referred to as global coordinates or world coordinates) can be defined relative to a particular point on vessel 10. For example, a coordinate system of a particular depth sensor can be used as the basis for the global coordinate system (e.g., a front-facing camera, such as depth sensor 72), and locations of points in an environment of vessel 10 can be defined based on the distance from an origin of that camera coordinate system. In such an example, an offset can be used to determine a location of a particular point on the vessel (e.g., a point of navigation, such as center of gravity (COG) or center of rotation (COR) of vessel 10). As another example, locations of points in an environment of vessel 10 can be defined based on the distance from a COG or COR of vessel 10. In some embodiments, the global coordinate system can use any suitable type of coordinate system, such as a 3D Cartesian coordinate system, a spherical coordinate system, a cylindrical coordinate system, etc.

In some embodiments, sensors 72-78 can determine and/or provide information regarding a location of an object in camera coordinates and using any suitable format (e.g., providing information using a depth image(s) such as an RGBD image, or using a point cloud in any suitable file format). Additionally or alternatively, in some embodiments, sensors 72-78 can determine and/or provide information regarding a location of an object in global coordinates (e.g., using a transform between camera coordinates and global coordinates identified during a calibration procedure) and using any suitable format (e.g., providing information using a depth image(s) such as an RGBD image, or using a point cloud in any suitable file format). In some embodiments, sensors 72-78 can provide position information for various points within that sensor's FOV to one or more controllers, such as to sensor processor 70 and/or controller 24 via any suitable communication network, such as by way of a dedicated bus connecting the sensors to a controller, a CAN bus, or wireless network link(s), as described below. In some embodiments, given the large amount of proximity data produced by depth sensors 72-78, the connection between sensors 72-78 and sensor processor 70 (and/or any other suitable processor) can be via a dedicated bus or network connection. Such a dedicated bus or network connection can be separate from the vessel network (e.g., including a CAN bus) in order to facilitate transmission of a large amount of depth measurement data (and, in some embodiments, IMU data) to sensor processor 70. Such massive data transmission may not be possible on a typical vessel network, such as a CAN bus or wireless network being used for communication by multiple devices. In some embodiments, sensor processor 70 can be configured to communicate filtered data on the vessel network, such as a CAN bus or wireless network. Additionally or alternatively, a dedicated communication link can be provided between sensor processor 70 and a propulsion controller, such as central controller 24.

In some embodiments, depth sensors 72-78 can include different types of sensors (e.g., depending on the distance between vessel 10 and an object, such as object O). For example, radar sensors can be used to detect objects at further distances, and cameras, sonic sensors, and/or lidar can be used for objects at closer distances. Note that depth camera sensors can be used, alone or in combination with any of the sensors described above, for example, to provide object location information to controller 24. Sensors 72-78 can be placed at positions on vessel 10 so that the sensor is at a height and facing a direction suitable to detect objects that vessel 10 is likely to encounter. Additionally, sensors 72-78 (and/or additional sensors) can be placed to have at least partially overlapping fields of view (e.g., as shown in FIG. 1). Note that optimal sensor positions can vary depending on vessel size and configuration.

In FIG. 1, the depth sensors shown are positioned to observe multiple regions around vessel 10, including the front, sides, and stern of vessel 10, and include a front-facing sensor 72, a front-starboard-facing sensor 73, a starboard-facing sensor 74, a front-port-facing sensor 73, a rear-facing sensor 76, a port-facing sensor 78. In some embodiments, one or more depth sensors can be placed on a hard top of marine vessel 10 and arranged such that the fields of view of the one or more depth sensors, combined, cover the entire 360° area surrounding vessel 10 (although there may be blind spots relatively close to vessel 10, such as where the hull obstructs the field of view). Note also that the relevant controller, such as sensor processor 70, can selectively operate any one or more of various different sensors (e.g., including depth cameras, radars, lidars, ultrasonics, or any other suitable sensor technology) to sense the location of objects in an environment of vessel 10.

In some embodiments, sensor processor 70 can integrate sensor data provided from one or more types of sensor into one or more models of an environment of vessel 10, objects within the environment, and/or vessel 10 itself. In such embodiments, the model(s) can be in any suitable format, such as one or more point clouds, one or more maps, one or more occupancy grids, and/or one or more data structures including a list of surrounding objects (e.g., including the object's size and position), integrating location information from multiple sensors. As described above, the location data from different sensors can be translated into a common reference frame (e.g., defined by the global coordinate system).

Autonomous and/or advanced operator assistance (sometimes referred to as semi-autonomous) controls for improved vessel handling qualities generally requires a relatively accurate ability to identify objects in an environment of vessel 10, often using multiple depth sensors mounted on vessel 10. In general, such depth sensors can be positioned to detect the objects in the marine environment surrounding marine vessel 10, such as a dock, a swimmer, or other obstruction in the current path and/or other potential paths of vessel 10. Each sensor can provide location information of features within its field of view relative to its own frame of reference (e.g., in the camera coordinate system associated with that sensor) and/or in a common frame of reference (e.g., in the global coordinate system). For example, the location information can be transformed from the respective camera coordinates at the camera and/or at a controller (e.g., sensor processor 70) using one or more transforms derived during a calibration procedure. Depending on the type of sensor(s), the application of use, boat size, hull shape, etc., multiple sensor types and sensor locations may be required to provide adequate sensing around the marine vessel for operation in all marine environments. To create a cohesive dataset that can be used for purposes of vessel control and vessel navigation, including autonomous vessel navigation and automatic maneuver-limiting control (e.g., velocity limiting for object avoidance, maintenance of a buffer zone, etc.), information from multiple sources (e.g., multiple depth sensors, multiple types of depth sensors, proximity sensors, etc.) can be translated to a common reference frame (the global coordinate system associated with the vessel). To accurately translate the information to the common reference frame typically can require precise knowledge of the posture (e.g., including 3D location, attitude, and/or orientation) of each sensor relative to the common reference frame such that the information received from each sensor can be translated appropriately. Regardless of what type of model(s) is being generated, the relevant sensor installation posture of each sensor on the marine vessel must be known so that the location information from each respective sensor can be properly interpreted for navigation purposes. Note that the posture of each sensor can be calculated or otherwise determined explicitly, however, such information is generally difficult to determine with sufficient accuracy. Alternatively, the posture of each sensor can be implicit in the transforms determined during a calibration or recalibration procedure (e.g., transforms that are optimized using machine learning techniques may not require explicit knowledge of the location of the sensors). In some embodiments, a calibration procedure can begin with an initial estimate of camera poses (e.g., based on measurement, a CAD model, data from a sensor associated with an adjustable sensor mount device), and the calibration procedure can include refining the initial estimate (e.g., via an optimization algorithm).

In some embodiments, vessel 10 can have a main inertial measurement unit (IMU) installed at a known location on the marine vessel. Referencing the example in FIG. 1, main IMU 36 can be part of an inertial navigation system (INS) such as including one or more micro-electro-mechanical systems (MEMS). For example, INS 60 can include a MEMS angular rate sensor, such as a rate gyro, a MEMS accelerometer, and a magnetometer. Such INS systems are well known in the relevant art. Additionally or alternatively, in some embodiments, motion and angular position (including pitch, roll, and yaw) can be sensed by a differently configured INS 60, or by an attitude heading reference system (AHRS) that provides 3D orientation of vessel 10 by integrating gyroscopic measurements, accelerometer data, and magnetometer data. In some embodiments, INS 60 can receive orientation information from main IMU 36 and can also receive information from a GPS receiver 40 comprising part of a satellite-based radio navigation system (e.g., a global navigation satellite system (GNSS)), such as the global positioning system (GPS). GPS receiver 40 can be located at a pre-selected fixed position on vessel 10, which provides information related to a position of vessel 10 with respect to a geographic and/or planetary frame of reference (e.g., latitude, longitude, and height with respect to sea level). In some embodiments, main IMU 36 can also be located at a known and fixed position with respect to the center of rotation (COR) and/or center of gravity (COG) of vessel 10 (e.g., a COG when the vessel is empty).

In some embodiments, mechanisms described herein can be configured to adjust a field of view of one or more of depth sensor 72-78 to capture information about a portion of an environment of vessel 10 in more detail and/or to capture information about a portion of the environment of vessel 10 that was not included in a FOV of any depth sensor (e.g., as described below in connection with FIG. 4). For example, as described below in connection with process 500 of FIG. 5, mechanisms described herein can determine whether to adjust a FOV of one or more depth sensors 72-78 based one or more objects in the environment of vessel 10, based on a relationship between one or more objects in the environment of vessel 10 and vessel 10, based on a current operating state of vessel 10, based on a maneuver being performed by vessel 10, and/or based on any other suitable information.

In some embodiments, subsequent to adjusting a field of view of one or more depth sensors, mechanisms described herein can adjust a transform associated with the depth sensor(s) for which the FOV has been adjusted. For example, in some embodiments, mechanisms described herein can adjust a transform for the depth sensor(s) based on an object at a known location and/or an object included in a FOV of another depth sensor(s) for which a transform is known. Additionally, in some embodiments, mechanisms described herein can adjust a transform associated with the depth sensor(s) periodically (e.g., at regular and/or irregular intervals), for example, to refine and/or verify the transform.

In some embodiments, IMU data from each sensor IMU 62-68 and/or main IMU 36 can be provided to sensor processor 70 and/or to another controller (e.g., CCM 24, INS 60, etc.). For example, the IMU data from each sensor IMU 62-68 can be transmitted along with the feature location information from the respective depth sensor 72-78. Additionally or alternatively, in some embodiments, each sensor IMU 62-68 can have an integrated microprocessor configured to process the respective sensor IMU data and compare the sensor IMU data to main IMU data and determine whether the sensor IMU data is inconsistent with the main IMU data based on the relative location of the sensor IMU with respect to main IMU 36. In some embodiments, as shown in FIG. 1, depth data and/or IMU data can be communicated to sensor processor 70 (and/or any other suitable controller), which can be via any suitable wired or wireless communication technique(s), such as via a dedicated communication bus, wireless transmission protocols (e.g. Bluetooth, Bluetooth Low Energy, ZigBee, etc.), a CAN bus comprising part of the vessel network, etc. Note that the dashed connection lines in FIG. 1 are meant to show only that the various control elements are capable of communicating with one another, and do not necessarily represent actual wiring connections between the control elements, nor do they represent the only paths of communication between the elements.

In some embodiments, some sensor processing functions can be performed by a separate computing device. For example, sensor processor 70 can communicate processed sensor data to central controller 24, which can utilize the processed data for navigation functions and/or other vessel control functions. In some embodiments, sensor processor 70 can be a dedicated, special-purpose computing system configured to process depth data and/or IMU data from depth sensors 72-78, sensor IMUs 62-68, and/or main IMU 36, and/or generate image data (e.g., which can be used to present an image of the environment to an operator, such as a portion of the environment that the operator cannot see from the operator's position). As described below, in some embodiments, sensor processor 70 can be associated with its own storage system comprising memory and its own processing system that executes programs and accesses data stored in the memory of sensor processor 70. Additionally or alternatively, in some embodiments, one or more functions described as being performed by sensor processor 70 can be incorporated in a multi-purpose controller, such as sensor processor software stored and executed within controller 24. For example, in some embodiments, controller 24 can control marine vessel navigation, such as autonomous point-to-point navigation, automatic docking, or other advanced operator assistance programs. In some embodiments, central controller 24 can also perform one or more sensor processing functions. Additionally or alternatively, in some embodiments, functions described herein as comprising part of the sensor processor functions can be distributed across two or more processing devices. For example, each depth sensor 72-78 can include one or more processors that are configured to perform certain functions (e.g., segmenting image data to classify one or more objects in the image, generate one or more RGBD images, generate one or more 3D depth maps, generate a point cloud corresponding to the 3D depth map, project points into a global coordinate system). As another example, each IMU 62-68 can include (or otherwise be associated with) one or more processors that are configured to perform calculations to interpret measured IMU data (such as to determine an attitude estimate for the respective IMU) and provide the interpreted IMU data to one or more other processing devices or controllers for execution of subsequent processing steps.

In some embodiments, sensor processor 70 can be programmed and/or otherwise configured to automatically perform a FOV adjustment process, in which sensor processor 70 can determine whether to adjust a FOV of one or more depth sensors, cause the FOV of one or more depth sensors to be changed, and update a transform associated with each of the one or more depth sensors based on the adjusted FOV (e.g., as described below in connection with FIGS. 4 and 5).

Figure 2:
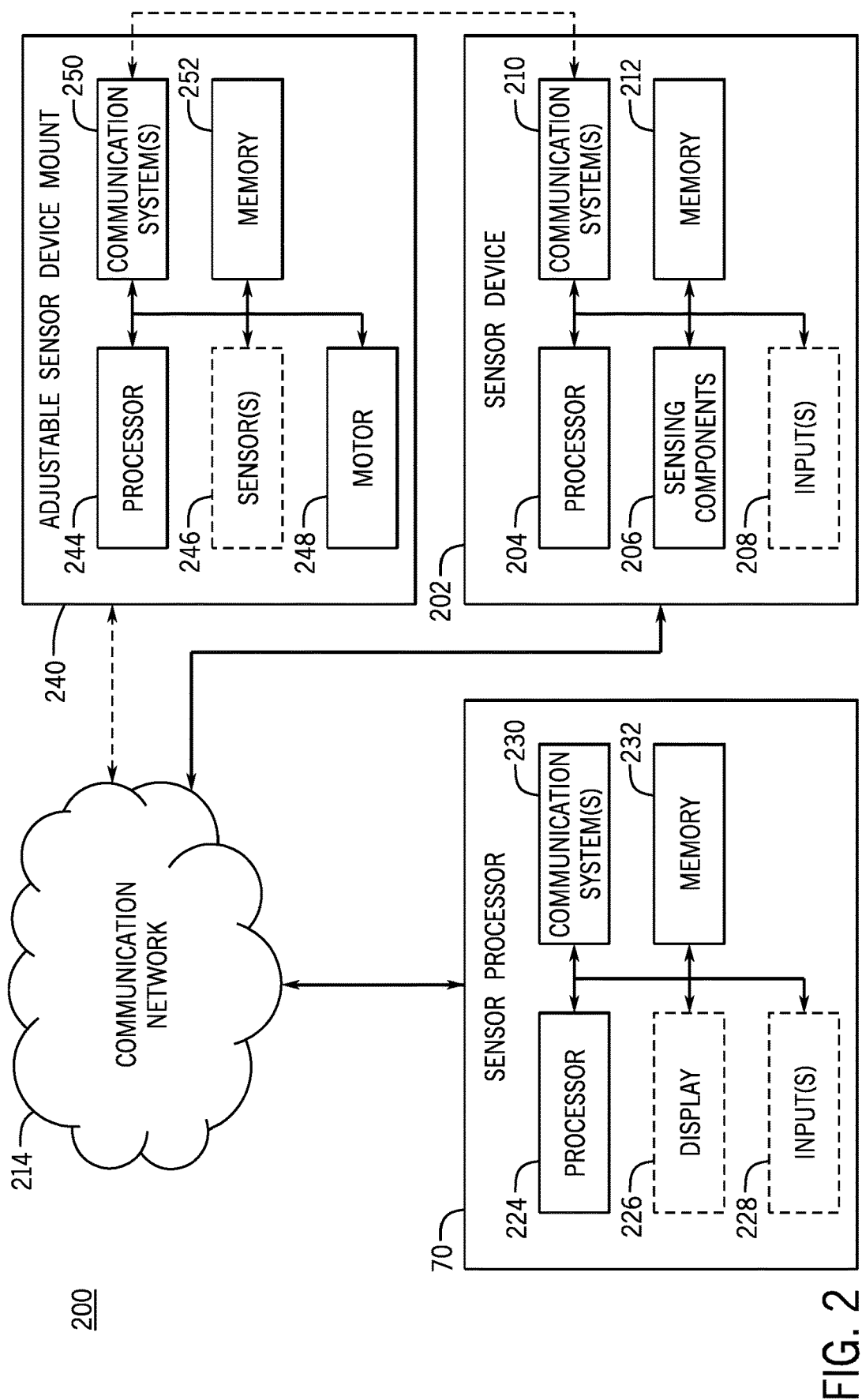
FIG. 2 shows an example of hardware that can be used to implement a sensor device, a sensor processor, and an adjustable sensor mount device in accordance with some embodiments of the disclosure.

FIG. 2 shows an example of hardware 200 that can be used to implement a sensor device 202 sensor processor 70, and an adjustable sensor device mount 240 in accordance with some embodiments of the disclosed subject matter.

As shown in FIG. 2, in some embodiments, sensor device 202 can include a processor 204, sensing components 206, one or more inputs 208, one or more communication systems 210, and/or memory 212. In some embodiments, processor 204 can be any suitable hardware processor or combination of processors, such as a central processing unit (CPU), an accelerated processing unit (APU), a graphics processing unit (GPU), a field programmable gate array (FPGA), an application specific integrated circuit (ASIC), etc.

In some embodiments, sensing components can include components that are used to determine a three-dimensional location of an object and/or other feature of an environment (e.g., a water surface) that is within a field of view of sensor device 202, and/or to capture image data of a scene within a field of view of sensor device 202. In some embodiments, sensor device 202 can include components used to implement one or more of depth sensors 72-78.

For example, depth sensor device 202 can be implemented as one or more cameras that include components that facilitate three-dimensional imaging of a region of an environment, such as a stereoscopic camera, a structured light camera, a continuous-wave time-of-flight camera, a direct time-of-flight camera, etc. As another example, depth sensor device 202 can be implemented as one or more lidar devices (e.g., a scanning lidar, a lidar including a 2D array sensor, etc.) that include components that facilitate three-dimensional characterization of a region of an environment. In such an example, a camera(s) (e.g., a two-dimensional camera) can be located to have an overlapping field of view with a lidar device (e.g., such a camera can be co-located), and can be used to capture images that can be used to classify portions of the environment (e.g., using a machine learning model trained to perform image segmentation). As yet another example, sensor device 202 can be implemented as one or more sound-based devices (e.g., one or more sonar systems, etc.) that include components that facilitate three-dimensional characterization of a region of an environment. As still another example, sensor device 202 can be implemented as one or more radio wave-based devices (e.g., one or more radar systems, etc.) that include components that facilitate three-dimensional characterization of a region of an environment.

In some embodiments, inputs 208 can include any suitable input devices and/or sensors that can be used to receive user input, such as a keyboard, a mouse, a touchscreen, a touchpad, a microphone, a camera, etc. In some embodiments, sensor device 202 can omit inputs (e.g., where depth sensor device is an embedded device, or where depth sensor device is not configured for direct end user operation).

In some embodiments, communications systems 210 can include any suitable hardware, firmware, and/or software for communicating information over a communication network 214 and/or any other suitable communication networks. For example, communications systems 210 can include one or more transceivers, one or more communication chips and/or chip sets, etc., that can be used to establish a wired and/or wireless communication link. In a more particular example, communications systems 210 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 212 can include any suitable storage device or devices that can be used to store instructions, values, etc., that can be used, for example, by processor 204 to generate depth information of a portion of the environment that characterizes the portion of the environment in three-dimensions, to identify and/or classify one or more objects and/or other features in a scene based on the depth information and/or image information, to communicate with sensor processor 70 via communications system(s) 210, etc. Memory 212 can include any suitable volatile memory, non-volatile memory, storage, or any suitable combination thereof. For example, memory 212 can include random access memory (RAM), read-only memory (ROM), electronically erasable programmable read-only memory (EEPROM), one or more flash drives, one or more hard disks, one or more solid state drives, one or more optical drives, etc. In some embodiments, memory 212 can have encoded thereon a computer program for controlling operation of depth sensor device 202. In such embodiments, processor 204 can execute at least a portion of the computer program to generate depth information, to identify and/or classify one or more objects and/or other features in a scene based on the depth information and/or image information, to transmit information to sensor processor 70, to execute at least a portion of a process for adjusting a FOV of one or more depth sensors, such as processes described below in connection with FIGS. 4 and 5, etc.

In some embodiments, depth sensor device 202 can include any suitable display device(s) (not shown), such as a computer monitor, a touchscreen, a television, etc.

In some embodiments, communication network 214 can be any suitable communication network or combination of communication networks. For example, communication network 214 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard(s), such as CDMA, GSM, LTE, LTE Advanced, 5G NR, etc.), a wired network, etc. In some embodiments, communication network 214 can include one or more portions of a control area network (CAN), a local area network (LAN), a wide area network (WAN), a public network (e.g., the Internet, which may be part of a WAN and/or LAN), any other suitable type of network, or any suitable combination of networks. Communications links shown in FIG. 2 can each be any suitable communications link or combination of communications links, such as wired links, fiber optic links, Wi-Fi links, Bluetooth links, cellular links, etc.

In some embodiments, sensor processor 70 can include a processor 224, a display 226, one or more inputs 228, one or more communications systems 230, and/or memory 232. In some embodiments, processor 224 can be any suitable hardware processor or combination of processors, such as a CPU, an APU, a GPU, an FPGA, an ASIC, etc. In some embodiments, display 226 can include any suitable display devices, such as a computer monitor, a touchscreen, a television, etc. In some embodiments, inputs 228 can include any suitable input devices and/or sensors that can be used to receive user input, such as a keyboard, a mouse, a touchscreen, a microphone, etc. In some embodiments, sensor processor 70 can omit inputs (e.g., where sensor processor 70 is an embedded device that is not configured for direct user interaction). For example, sensor processor 70 can provide results of an analysis, image data, and/or a portion of a user interface to CCM 24, and CCM 24 can use the results, image data, and/or user interface to present an image(s) and/or user interface.

In some embodiments, communications systems 230 can include any suitable hardware, firmware, and/or software for communicating information over communication network 214 and/or any other suitable communication networks. For example, communications systems 230 can include one or more transceivers, one or more communication chips and/or chip sets, etc., that can be used to establish a wired and/or wireless communication link. In a more particular example, communications systems 230 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 232 can include any suitable storage device or devices that can be used to store instructions, values, etc., that can be used, for example, by processor 224 to analyze image data and/or depth information received from depth sensor device 202 (and/or any other suitable depth sensor device), to identify and/or classify one or more objects and/or other features in a scene based on the depth information and/or image information, to communicate with depth sensor device 202 via communications system(s) 230, etc. Memory 232 can include any suitable volatile memory, non-volatile memory, storage, or any suitable combination thereof. For example, memory 232 can include RAM, ROM, EEPROM, one or more flash drives, one or more hard disks, one or more solid state drives, one or more optical drives, etc. In some embodiments, memory 232 can have encoded thereon a computer program for controlling operation of sensor processor 70. In such embodiments, processor 224 can determine whether one or more criteria are satisfied that indicate that a FOV of one or more depth sensors are to be adjusted, analyze depth information to identify and/or classify one or more objects and/or other features in a scene based on the depth information and/or image information, to receive information from sensor device 202, to execute at least a portion of a process adjusting a FOV of one or more depth sensors, such as processes described below in connection with FIGS. 4 and 5, etc.

In some embodiments, adjustable sensor device mount 240 can include a processor 244, one or more sensors 246, a motor(s) 248, one or more communications systems 250, and/or memory 252. In some embodiments, processor 224 can be any suitable hardware processor or combination of processors, such as a CPU, an APU, a GPU, an FPGA, an ASIC, etc.

In some embodiments, sensor(s) 246 can include any suitable sensor or combination of sensors that can be used to measure and/or report any suitable information parameters of adjustable sensor device mount 240 and/or one or more components thereof. For example, sensor(s) 246 can be configured to measure and/or determine rotation of a component of adjustable sensor device mount 240 (e.g., a rotatably adjustable bracket), rotation of a rotary actuator (e.g., a rotatory actuation that tilts a component of adjustable sensor device mount 240), extension of a linear actuator (e.g., where extension of the linear actuation tilts a component of adjustable sensor device mount 240 extension), etc. In some embodiments, sensor(s) 246 can be omitted, for example, where a sensor included sensor device 202 (e.g., an IMU, an image sensor, etc.) is used to determine a posture of sensor device 202.

In some embodiments, motor(s) 248 can include any suitable motor(s) that is operated to cause a change in posture of one or more components of adjustable sensor device 240. For example, motor 248 can include a motor of a rotary actuator. As another example, motor 248 can include a motor of a linear actuator. In a more particular example, motor 248 can be implemented as a servomotor associated with a position encoder (e.g., used to implement sensor(s) 246). Additionally or alternatively, in some embodiments, adjustable sensor device mount 240 can change a posture of one or more components of adjustable sensor device 240 using other techniques, such as pneumatic and/or hydraulic techniques (e.g., a pneumatic or hydraulic actuator). In some such embodiments, motor(s) 248 can be omitted from adjustable sensor device 240.

In some embodiments, communications systems 250 can include any suitable hardware, firmware, and/or software for communicating information over communication network 214 and/or any other suitable communication networks. For example, communications systems 250 can include one or more transceivers, one or more communication chips and/or chip sets, etc., that can be used to establish a wired and/or wireless communication link. In a more particular example, communications systems 250 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 252 can include any suitable storage device or devices that can be used to store instructions, values, etc., that can be used, for example, by processor 244 to control motor(s) 248, determine a posture of one or more components of adjustable sensor device mount 240, to communicate with sensor processor 70 and/or sensor device 202 via communications system(s) 250 (e.g., to provide information indicative of a posture of one or more components of adjustable sensor device mount 240), etc. Memory 252 can include any suitable volatile memory, non-volatile memory, storage, or any suitable combination thereof. For example, memory 252 can include RAM, ROM, EEPROM, one or more flash drives, one or more hard disks, one or more solid state drives, one or more optical drives, etc. In some embodiments, memory 252 can have encoded thereon a computer program for controlling operation of adjustable sensor device mount 240.

FIGS. 3A1-3A3 show an example of a sensor device coupled to an adjustable sensor mount device to rotate via a first side in accordance with some embodiments of the disclosure. As shown in FIGS. 3A1-3A3, in some embodiments, a stereoscopic camera 302 can be rotatably mounted (e.g., to a portion of vessel 10) to facilitate adjusting a FOV of camera 302. This can facilitate sensing (e.g., by an autonomy system of vessel 10) portions of the physical environment that are pertinent in particular circumstances, and that may not be readily observable with camera 302 (and/or any other suitable depth sensor) in a different posture. As shown in FIG. 3A1, stereoscopic camera 302 can include a first camera 304 and a second camera 306 that form a stereoscopic pair. Image data from cameras 304 and 306 can be analyzed to determine a position of objects in a scene captured within the image data using conventional stereoscopic imaging techniques. In some embodiments, cameras 304 and 306 can be implemented as monochromatic cameras (e.g., that capture scene brightness without color filters). Additionally, in some embodiments, stereoscopic camera 302 can include a color camera 308 that can be used to capture a color image(s) of the scene (e.g., with a FOV at least partially overlapping the FOV of cameras 304 and 306). For example, such images can be used to perform image segmentation, object detection, and/or other machine vision tasks that may be facilitated by color images.

In some embodiments, stereoscopic camera 302 can be mechanically coupled to a mounting surface 310. For example, stereoscopic camera 302 can be mechanically coupled to mounting surface 310 via one or more fasteners, adhesives, etc. In some embodiments, stereoscopic camera 302 can be mechanically coupled to a mounting surface 310 such that an optical axis of cameras 304, 306, and 308 is tilted with respect to mounting surface 310. In FIGS. 3A1-3A3, mounting surface 310 is mechanically coupled to a fist side of camera 302, such that an optical axis of cameras 304, 306, and 308 is tilted away from mounting surface 310.

In some embodiments, mounting surface 310 can be mechanically coupled to vessel 10 using one or more components that facilitate rotation of mounting surface 310 and stereoscopic camera 302 with respect to vessel 10. For example, mounting surface 310 can be mechanically coupled (e.g., via a hinge(s), a shaft, a pivot bearing, etc.) to vessel 10 such that operation of a motor (e.g., motor 248) can cause an angle of mounting surface 310 to change with respect to vessel 10.

As shown in FIG. 3A2, mounting surface 310 can be coupled to vessel 10 such that mounting surface 310 pivots about a long axis 312 coinciding with a rear of camera 302. For example, camera 302 can be mounted such that an optical axis 314 of camera 304 is tilted down if mounting surface 310 is level. Rotation about axis 312 can cause optical axis 314 (and FOV) to tilt farther down or to tilt up toward (or past) level. In some embodiments, a motor(s) can be coupled to mounting surface 310 such that actuation of the motor causes mounting surface 310 to rotate about axis 312. Alternatively, in some embodiments, mounting surface 310 can be coupled to vessel 10 such that mounting surface 310 pivots about a long axis 316 coinciding with a front of camera 302. FIG. 3A2 shows camera 302 rotated around axis 312 such that optical axis 314 is tilted nearly perpendicular to level (e.g., such that a field of view of camera 302 includes a portion of the environment nearly directly below camera 302).

As shown in FIG. 3A3, mounting surface 310 can be coupled to vessel 10 such that mounting surface 310 pivots about a long axis 316 coinciding with a front of camera 302. For example, camera 302 can be mounted such that an optical axis 314 of camera 304 is level or close to level, such that a center of a field of view of camera 302 includes portions of an environment farther from vessel 10. Rotation about axis 316 can cause optical axis 314 (and FOV) to tilt down or to tilt up. In some embodiments, a motor(s) can be coupled to mounting surface 310 such that actuation of the motor causes mounting surface 310 to rotate about axis 316. Alternatively, in some embodiments, mounting surface 310 can be coupled to vessel 10 such that mounting surface 310 pivots about axis 312. FIG. 3A3 shows camera 302 rotated around axis 316 such that optical axis 314 is tilted farther from level (e.g., such that a field of view of camera 302 includes a portion of the environment closer to camera 302).

FIG. 3B1-3B3 show example of the sensor device coupled to an adjustable sensor mount device to rotate via a second side in accordance with some embodiments of the disclosure.

In some embodiments, stereoscopic camera 302 can be mechanically coupled to a mounting surface 320. For example, stereoscopic camera 302 can be mechanically coupled to mounting surface 320 via one or more fasteners, adhesives, etc. In some embodiments, stereoscopic camera 302 can be mechanically coupled to a mounting surface 320 such that an optical axis of cameras 304, 306, and 308 is tilted with respect to mounting surface 320. In FIGS. 3B1-3B3, mounting surface 320 is mechanically coupled to a second side of stereoscopic camera 302, such that an optical axis of cameras 304, 306, and 308 is tilted toward mounting surface 320.

In some embodiments, mounting surface 320 can be mechanically coupled to vessel 10 using one or more components that facilitate rotation of mounting surface 320 and stereoscopic camera 302 with respect to vessel 10. For example, mounting surface 320 can be mechanically coupled (e.g., via a hinge(s), a shaft, a pivot bearing, etc.) to vessel 10 such that operation of a motor (e.g., motor 248) can cause an angle of mounting surface 320 to change with respect to vessel 10.

As shown in FIG. 3B2, mounting surface 320 can be coupled to vessel 10 such that mounting surface 310 pivots about a long axis 326 coinciding with a front of camera 302. For example, camera 302 can be mounted such that optical axis 314 of camera 304 is tilted down if mounting surface 320 is level. Rotation about axis 326 can cause optical axis 314 (and FOV) to tilt farther down or to tilt up toward (or past) level. In some embodiments, a motor(s) can be coupled to mounting surface 310 such that actuation of the motor causes mounting surface 310 to rotate about axis 326. Alternatively, in some embodiments, mounting surface 320 can be coupled to vessel 10 such that mounting surface 320 pivots about a long axis 322 coinciding with a rear of camera 302. FIG. 3B2 shows camera 302 rotated around axis 326 such that optical axis 314 is tilted nearly perpendicular to level (e.g., such that a field of view of camera 302 includes a portion of the environment nearly directly below camera 302), and tilted to about level.

As shown in FIG. 3B3, mounting surface 310 can be coupled to vessel 10 such that mounting surface 320 pivots about axis 322 coinciding with a rear of camera 302. For example, camera 302 can be mounted such that an optical axis 314 of camera 304 is level or close to level, such that a center of a field of view of camera 302 includes portions of an environment farther from vessel 10. Rotation about axis 322 can cause optical axis 314 (and FOV) to tilt down or to tilt up. In some embodiments, a motor(s) can be coupled to mounting surface 320 such that actuation of the motor causes mounting surface 310 to rotate about axis 322. Alternatively, in some embodiments, mounting surface 320 can be coupled to vessel 10 such that mounting surface 320 pivots about axis 326. FIG. 3B3 shows camera 302 rotated around axis 322 such that optical axis 314 is tilted farther from level (e.g., such that a field of view of camera 302 includes a portion of the environment closer to camera 302).

FIG. 3C1-3C3 show examples of the sensor device coupled to an adjustable sensor mount device to rotate around a central axis in accordance with some embodiments of the disclosure.

In some embodiments, stereoscopic camera 302 can be mechanically coupled to a mounting surface 330. For example, stereoscopic camera 302 can be mechanically coupled to mounting surface 330 via one or more fasteners, adhesives, etc. In some embodiments, stereoscopic camera 302 can be mechanically coupled to mounting surface 330 such that an optical axis of cameras 304, 306, and 308 is tilted with respect to mounting surface 320. In FIGS. 3C1-3C3, mounting surface 330 is mechanically coupled to the first side of stereoscopic camera 302, such that an optical axis of cameras 304, 306, and 308 is tilted away from mounting surface 330. However, mounting surface 330 can be mechanically coupled to the first side of stereoscopic camera 302, such that an optical axis of cameras 304, 306, and 308 is tilted toward mounting surface 330 (e.g., as described above in connection with FIGS. 3B1-3B3).

In some embodiments, mounting surface 330 can be mechanically coupled to vessel 10 via a bracket 332 to which a shaft 334 is coupled. Note that multiple brackets can be used to couple mounting surface 330 to vessel 10 (e.g., a corresponding bracket 332 can be coupled to the other end of mounting surface 330). In some embodiments, shaft 334 can facilitate rotation of mounting surface 330 and stereoscopic camera 302 with respect to vessel 10. For example, shaft 334 can be mechanically coupled to vessel 10 such that operation of a motor (e.g., motor 248) can cause an angle of mounting surface 320 to change with respect to vessel 10 via rotation of shaft 334 and/or mounting surface 330.

As shown in FIG. 3C2, mounting surface 320 can be coupled to vessel 10 such that mounting surface 310 pivots about a central axis of camera 302. For example, camera 302 can be mounted such that optical axis 314 of camera 304 is tilted down if mounting surface 330 is level. Rotation about the central axis can cause optical axis 314 (and FOV) to tilt farther down or to tilt up toward (or past) level. In some embodiments, a motor(s) can be coupled to shaft 334 such that actuation of the motor causes mounting surface 330 to rotate about the central axis.

As shown in FIG. 3C3, mounting surface 330 can be coupled to vessel 10 such that camera 302 is mounted with the first side facing a different direction from what is shown in FIG. 3C2.

Figure 4:
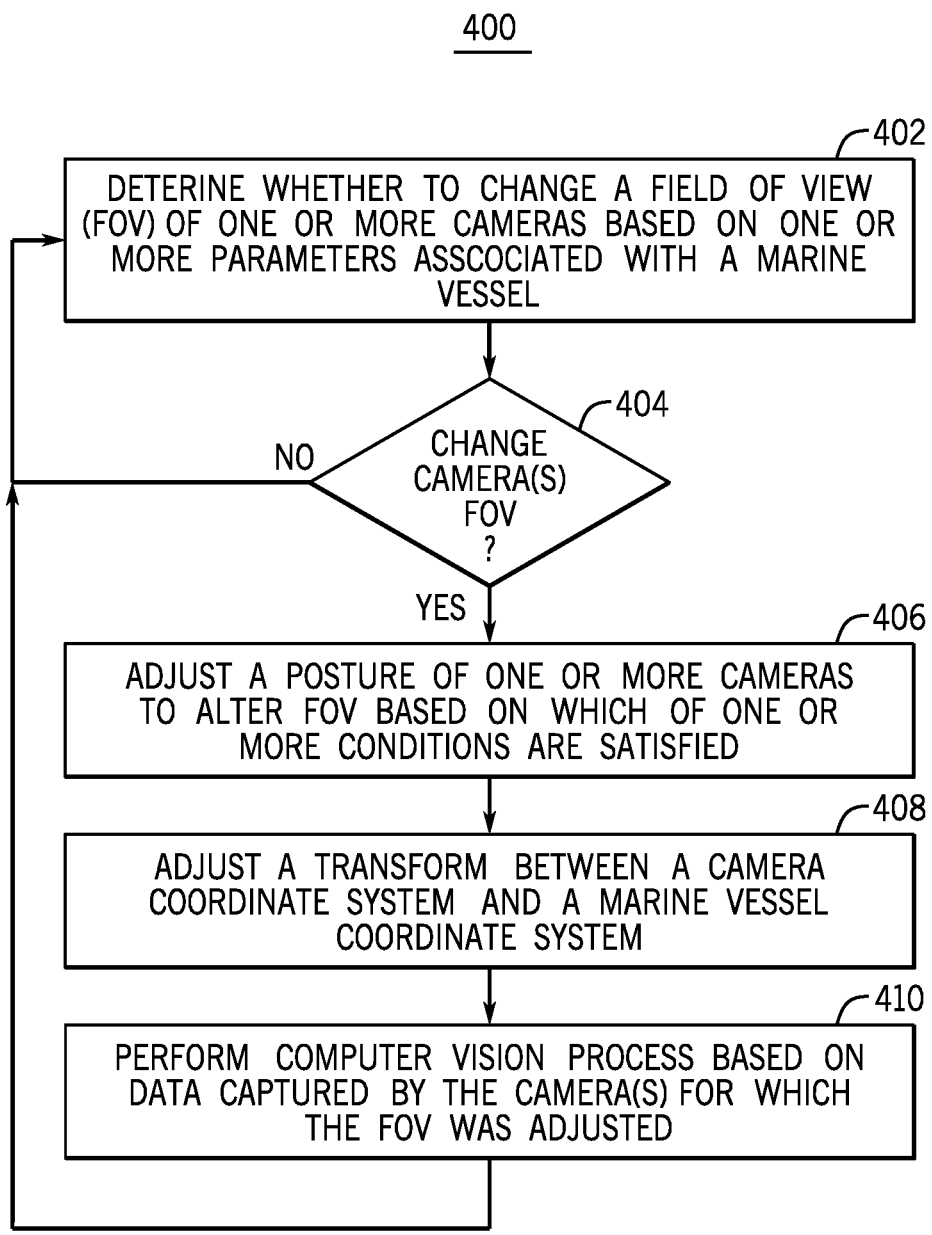
FIG. 4 shows an example of a process for adjusting a field of view of a vision system on a marine vessel in accordance with some embodiments of the disclosure.

FIG. 4 shows an example of a process 400 for adjusting a field of view of a vision system on a marine vessel in accordance with some embodiments of the disclosure.

At 402, process 400 can determine whether to change a field of view (FOV) of one or more cameras of a vision system on the marine vessel based on one or more parameters associated with the marine vessel. In some embodiments, at 402, process 400 can determine whether certain conditions are present indicating that an adjustment to a FOV of one or more cameras is to be performed. For example, in some embodiments, process 400 can determine whether one or more trigger conditions have been satisfied, indicating that a FOV of at least a portion of the vision system is to be changed.

In some embodiments, process 400 can use any suitable parameters to determine whether to adjust a FOV of one or more cameras of the vision system (e.g., to determine whether a trigger condition has been satisfied). For example, process 400 can use a speed of the vessel as a parameter to determine whether one or more conditions have been satisfied. In such an example, process 400 can use vessel speed to determine whether the vessel is moving relatively slowly, relatively quickly, etc.

As another example, process 400 can use a proximity of one or more objects and/or a classification of the one or more objects in an environment (e.g., based on objects detected via the vision system) as a parameter to determine whether one or more conditions have been satisfied. In such an example, process 400 can use proximity and/or classification of objects to determine whether marine the vessel is close to a high risk object (e.g., a person, another boat, etc.) and/or in a congested area, and can determine that the vessel is in a low speed collision avoidance situation based on the proximity and/or identity of one or more objects in the environment.

As yet another example, process 400 can determine whether the marine vessel is digitally (e.g., using a station keeping feature) and/or physically anchored (e.g., using a physical anchor), and can utilize a determination of whether the vessel is anchored as a parameter.

As still another example, process 400 can determine whether the marine vessel is likely docking as a parameter to determine whether one or more conditions have been satisfied. In such an example, process 400 can determine that the vessel is likely docking using any suitable technique or combination of techniques.

As a further example, process 400 can determine whether the marine vessel is secured (e.g., moored, docked, etc.) as a parameter to determine whether one or more conditions have been satisfied. In such an example, process 400 can determine whether the vessel is secured using any suitable technique or combination of techniques. A vessel can be secured using a variety of techniques, and can be secured in various ways (e.g., a vessel can be secured if the vessel is secured to a dock or mooring ball; if an anchor of the vessel has been deployed; if the vessel is beached; if it is tied up to any suitable structure, etc.). In a particular example, an indication that the vessel is secured can be based on input from a user (e.g., via a hardware-based user interface element, via a software-based user interface element presented via a touchscreen such as an MFD, via a mobile device such as a smartphone or tablet computer, etc.).

As another further example, process 400 can determine whether the marine vessel is in a situation (e.g., based on one or more other parameters) in which an operator of the marine vessel, and/or one or more occupants of the marine vessel are to be monitored for safety. For example, process 400 can determine that an operator and/or occupant is to be monitored for safety if the vessel is moving at relatively high speed, and/or is on plane. As another example, process 400 can determine that an operator and/or occupant is to be monitored for safety if user input has been received to monitor an operator and/or occupant. As yet another example, process 400 can determine that an operator and/or occupant is to be monitored for safety if the vessel is in gear (e.g., forward or reverse) and user input has not been received at a control panel (e.g., via a steering wheel, a throttle lever, a joystick, etc.), and/or an operator is not detected at a control panel (e.g., by a helm camera or other sensor) for a predetermined period of time (e.g., a certain number of seconds, minutes, etc.).

As yet another further example, process 400 can determine whether the marine vessel is being actively operated (e.g., an ignition switch is in a position other than "on" or "start", the motor(s) is off or in a generator mode, etc.) as a parameter to determine whether one or more conditions have been satisfied.

Additional and/or more detailed examples of various parameters and/or trigger conditions are described below in connection with process 500 of FIG. 5.

If process 400 determines that no change in the FOV of the vision system is to be made ("NO" at 404), process 400 can return to 402.

Otherwise, if process 400 determines that a FOV of one or more cameras is to be changed ("YES" at process 400 can move to 406.

At 406, process 400 can adjust a posture of one or more cameras of the vision system to alter a FOV of the vision system based on which of one or more conditions are satisfied at 402. In some embodiments, process 400 can adjust a posture of a particular camera(s) based on the condition(s) that was satisfied. Additionally, in some embodiments, process 400 can determine which camera(s) to adjust based on the condition(s) that was satisfied, one or more parameters, and/or a location of one or more objects in the environment. Examples of how a posture of a camera(s) can be adjusted based on a determination that a trigger condition(s) has been satisfied are described below in connection with process 500 of FIG. 5. Additionally, examples of various different camera postures are described below in connection with FIGS. 6A to 6F.

At 408, process 400 can adjust a transform between a camera coordinate system of the one or more cameras for which the posture has been changed and the coordinate system associated with the marine vessel (e.g., the global coordinate system). In some embodiments, process 400 can adjust the transform between a camera coordinate system associated with a camera for which a posture was changed. As described above, a transform between a camera coordinate system and a global coordinate system that facilitates a relatively accurate determination in the global coordinate system of a location of an object detected in the camera coordinate system can depend on the posture of the depth sensor with respect to the global coordinate system. In some embodiments, process 400 can adjust the transform from an initial transform (e.g., a transform used for data from the camera before adjustment) to an adjusted transform that can be used to relatively accurately determine a 3D location in the global coordinate system based on a 3D location in the camera coordinate system.

In some embodiments, process 400 can use any suitable technique or combination of techniques to adjust the transform. For example, in some embodiments, transforms can be determined during a calibration for a variety of camera postures (e.g., tilt angles), and process 400 can select a transform based on an estimate of the camera posture (e.g., based on a value(s) received from a sensor(s)). As another example, in some embodiments, process 400 can perform one or more operations to the transform based on a change in the camera posture and a relationship between camera posture and transform. As yet another example, in some embodiments, process 400 can refine the transform based on a location of a known point in global coordinates and a location of that point in the camera coordinate system. In such an example, the point can be a known point that is fixed with respect to the global coordinate system (e.g., a fixed point on the marine vessel), or a point that is known from another camera with a reliable transform (e.g., a point in the environment that is in an overlapping FOV of both cameras).

At 410, process 400 can perform one or more computer vision process(es) based on data captured by the camera(s) for which the FOV was adjusted. For example, in some embodiments, data from the camera(s) can be used to determine a location of an object and/or obstacle in the environment (e.g., a dock), which can be used to perform an autonomous and/or advanced operator assistance function (e.g., automatic docking, path planning, autonomous control, object collision avoidance, overhead collision avoidance, etc.). In such an example, certain functions can benefit from data associated with portions of the environment that are relatively close (e.g., auto docking, low speed collision avoidance, etc.). As another example, data from the camera(s) can be used to monitor an interior of a marine vessel for safety and/or security.

Figure 5:
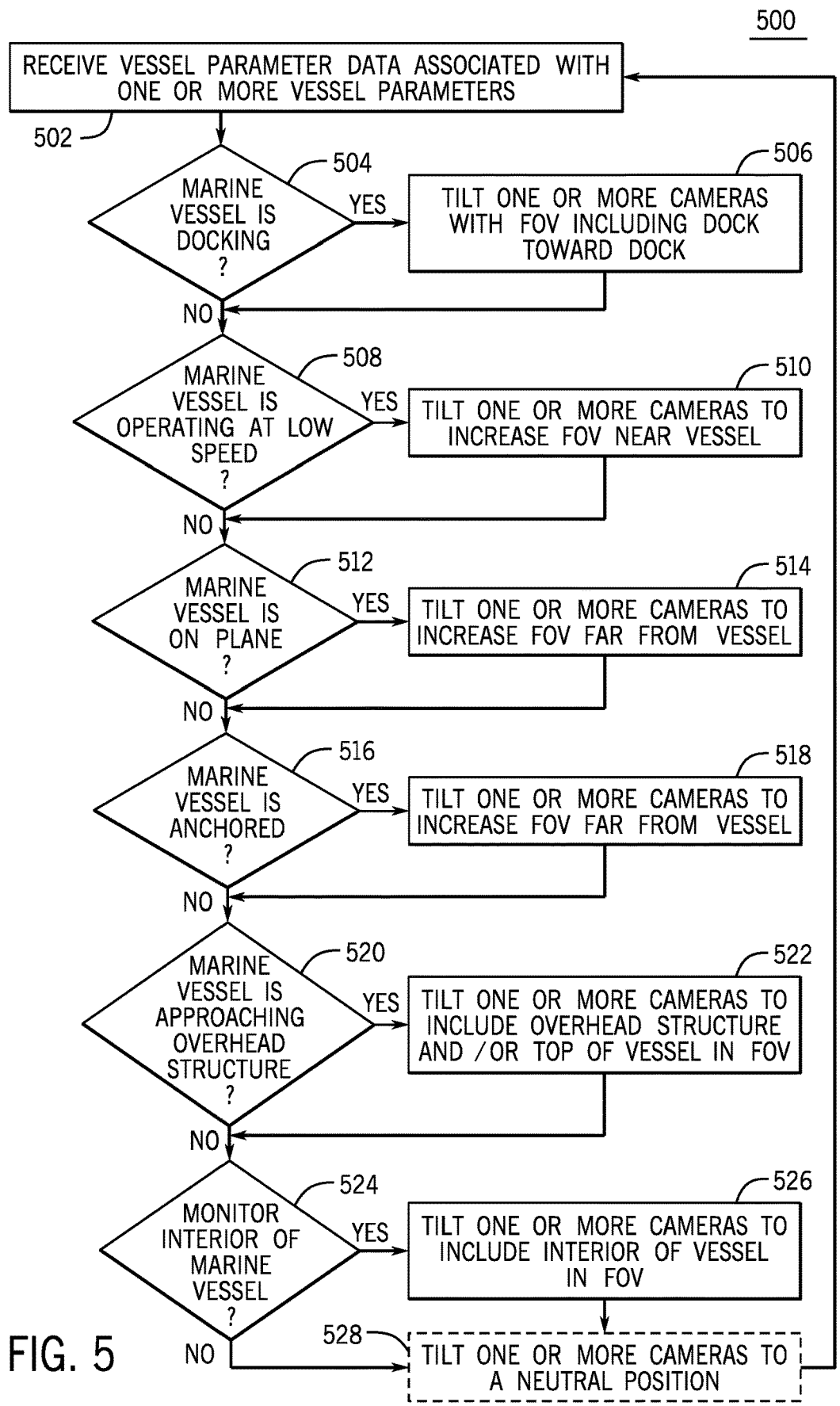
FIG. 5 shows an example of a process for determining how to adjust the field of view of the vision system on a marine vessel in accordance with some embodiments of the disclosure.

FIG. 5 shows an example of a process 500 for determining how to adjust the field of view of the vision system on a marine vessel in accordance with some embodiments of the disclosure.

At 502, process 500 can receive data associated with various vessel parameters. In some embodiments, process 500 can receive any suitable parameter(s) that can be used to determine whether one or more conditions associated with various camera postures have been satisfied.

In some embodiments, process 500 can receive any suitable vessel parameters at 502, such as a speed of the vessel, a direction of travel of the vessel (e.g., a heading in a geographic coordinate system, a heading in the global coordinate system, etc.), a gear (e.g., forward, reverse, neutral), a commanded rotational speed and/or direction of a motor(s) (e.g., if not using conventional gears, using a joystick, etc.), a proximity of one or more objects in the environment of the vessel, a location of one or more objects in the environment, a classification of one or more objects in the environment, an indication of whether the vessel is anchored, an indication of whether the vessel is secured, an indication of whether the vessel is being actively operated, any other suitable parameter(s), or any suitable combination thereof.

At 504, process 500 can determine whether the marine vessel is likely docking. In some embodiments, process 500 can use any suitable technique or combination of techniques to determine whether the marine vessel is docking. For example, if a vessel is in an autonomous navigation mode, process 500 can use a distance and/or proximity to a target docking location to determine whether the vessel is docking. As another example, if a vessel is being operated at least in part manually, process 500 can use a speed, heading, and/or location of a dock with respect to the vessel to determine whether the vessel is docking.

If process 500 determines that the marine vessel is likely docking ("YES" at 504), process 500 can move to 506.

At 506, process 500 can tilt and/or rotate one or more cameras with a FOV that includes the dock (e.g., after being tilted) toward the dock. In some embodiments, process 500 can adjust a FOV of a camera by tilting and/or rotating the camera downward. For example, process 500 can adjust the camera to a have a FOV that minimizes a blind spot between the vessel and the dock (e.g., as described below in connection with FIG. 6A).

Otherwise, if process 500 determines that the marine vessel is unlikely to be docking ("NO" at 504) and/or after adjusting a FOV of one or more cameras at 506, process 500 can move to 508.

At 508, process 500 can determine whether the marine vessel is operating at relatively low speed. In some embodiments, a relatively low speed can be an idle speed or slower, a speed in which the vessel is not on plane, a speed below a predetermined threshold, etc.

If process 500 determines that the marine vessel is operating at relatively low speed ("YES" at 508), process 500 can move to 510.

At 510, process 500 can tilt and/or rotate one or more cameras to increase a FOV near the vessel. In some embodiments, process 500 can adjust a FOV of a camera by tilting and/or rotating the camera downward. For example, process 500 can adjust the camera to a have a FOV that reduces a blind spot between the vessel and an edge of the FOV (e.g., as described below in connection with FIG. 6B). As another example, process 500 can adjust a bow-facing camera to be more level at relatively low speeds, as a pitch of the vessel can be relatively steep at low speeds (e.g., as the vessel is accelerating to get on plane), which can cause a FOV of bow-facing cameras to pitch up with the vessel.

Otherwise, if process 500 determines that the marine vessel is not traveling at relatively low speed ("NO" at 508), process 500 can move to 512.

At 512, process 500 can determine whether the marine vessel is operating at relatively high speed (e.g., if the marine vessel is likely to be on plane). In some embodiments, a relatively high speed can be a speed associated with the vessel being on plane, any speed at which the vessel is on plane, etc.

If process 500 determines that the marine vessel is operating at relatively high speed ("YES" at 512), process 500 can move to 514.

At 514, process 500 can tilt and/or rotate one or more cameras to increase a FOV far from the vessel. In some embodiments, process 500 can adjust a FOV of a camera by tilting and/or rotating the camera upward (e.g., such that the optical axis of the camera is approximately level, is closer to level, etc.). For example, process 500 can adjust the camera to a have a FOV in which relatively distance objects are in a center of the FOV (e.g., as described below in connection with FIG. 6C). In a particular example, a horizon in the environment may not be in a current FOV, such that relatively distant objects may not be included in the FOV. In such an example, process 500 can adjust the camera to have a FOV in which relatively distance objects are included in the FOV. As another more particular example, the horizon may be in the current FOV, but may be near an edge of the FOV, such that objects near the horizon (e.g., floating on and/or moving across a water surface) are only partially included in the FOV. In such an example, process 500 can adjust the camera to have a FOV in which relatively distance objects are more fully (or completely) included in the FOV.

Otherwise, if process 500 determines that the marine vessel is not traveling at relatively high speed ("NO" at 512), process 500 can move to 516.

At 516, process 500 can determine whether the marine vessel is anchored. In some embodiments, in some embodiments, process 500 can use any suitable information to determine whether the marine vessel is anchored. For example, if the marine vessel is in a station keeping mode, process 500 can determine that the vessel is anchored. As another example, process 500 can determine whether an anchor has been deployed (e.g., based on a motor and/or sensor associated with deploying an anchor such as via a windlass).

If process 500 determines that the marine vessel is anchored ("YES" at 516), process 500 can move to 518.

At 518, process 500 can tilt and/or rotate one or more cameras to increase a FOV far from the vessel. In some embodiments, process 500 can adjust a FOV of a camera by tilting and/or rotating the camera upward (e.g., such that the optical axis of the camera is approximately level, is closer to level, etc.). For example, process 500 can adjust the camera to a have a FOV in which relatively distance objects are in a center of the FOV (e.g., as described below in connection with FIG. 6C). Additionally, in some embodiments, at 518, process 500 can tilt and/or rotate one or more cameras to include a propulsion device(s) and/or an area near the propulsion device(s) in a FOV of the one or more cameras. For example, process 500 can tilt and/or rotate a camera(s) to monitor for people (e.g., a person swimming, an occupant of the vessel near a motor, etc.) and/or obstacles. In some embodiments, including the propulsion device(s) in a FOV of one or more cameras can facilitate safety monitoring while the vessel is anchored (e.g., digitally or physically), which can reduce a likelihood that operation of a propulsion device(s) causes injury to a person and/or damage to the propulsion device(s) caused by a nearby object.

Otherwise, if process 500 determines that the marine vessel is not anchored ("NO" at 516), process 500 can move to 520.

At 520, process 500 can determine whether the marine vessel is approaching an overhead structure. In some embodiments, process 500 can use any suitable technique or combination of techniques to determine whether the marine vessel is approaching an overhead structure. For example, process 500 can determine a planned and/or predicted path of the vessel (e.g., a path planned by an autonomy system of the vessel, a predicted path based on a current heading and speed, a tree or tree limb, etc.), and can determine whether the planned path coincides with an overhead structure, such as a bridge, a boat house, a covered dock, etc.

In some embodiments, a location of overhead structures can be identified using any suitable technique or combination of techniques. For example, process 500 can use a current location of the vessel and map information that includes overhead structures. In such an example, the map information can be conventional map information (e.g., a nautical chart with markings for bridges), and/or an occupancy map (e.g., indicating which cells of a grid are occupied by an object). As another example, process 500 can use computer vision techniques to identify overhead structures (e.g., using image segmentation and/or object recognition techniques), and can determine a location of the overhead structure(s) using location information of the identified structures (e.g., based on locations associated with points in a point cloud corresponding to the structure), and can determine whether a planned and/or predicted path is likely to coincide with the overhead structure.

If process 500 determines that the marine vessel is approaching an overhead structure ("YES" at 520), process 500 can move to 522.

At 522, process 500 can tilt one or more cameras to include the overhead structure and/or a top of the marine vessel (e.g., including any fixtures or other objects on the vessel that may extend above a top of the vessel). In some embodiments, process 500 can adjust a FOV of a camera by tilting and/or rotating the camera upward, such that the optical axis is near or past vertical (e.g., as described below in connection with FIG. 6D). For example, process 500 can adjust the camera to a have a FOV in which an underside of the overhead structure is within the FOV. Additionally or alternatively, in some embodiments, process 500 can adjust a camera such that objects protruding above a top of the vessel (e.g., antennas, radomes, satellite dishes, fishing poles, etc.) are included within the FOV.

Otherwise, if process 500 determines that the marine vessel is not approaching an overhead structure ("NO" at 520), process 500 can move to 524.

At 524, process 500 can determine whether an interior of the marine vessel is to be monitored. In some embodiments, process 500 can determine that the interior is to be monitored for safety (e.g., to determine whether an operator is present at an operation console, to determine whether an operator is alert, to determine whether an operator is authorized to operate the vessel, etc.). Additionally or alternatively, in some embodiments, process 500 can determine that the interior is to be monitored for security (e.g., when the vessel is secured, to determine whether any unauthorized person(s) are on board).

If process 500 determines that an interior of the marine vessel is to be monitored ("YES" at 524), process 500 can move to 526.

At 526, process 500 can tilt and/or rotate one or more cameras to at least a portion of an interior of the vessel in the FOV (e.g., an area in front of an active operation console). In some embodiments, process 500 can adjust a FOV of a camera by tilting and/or rotating the camera such that the optical axis passes through at least a portion of an interior of the vessel (e.g., as described below in connection with FIG. 6E).

Otherwise, if process 500 determines that monitoring of an interior of the marine vessel is not to be performed ("NO" at 524), process 500 can move to 528.

Figure 6A:
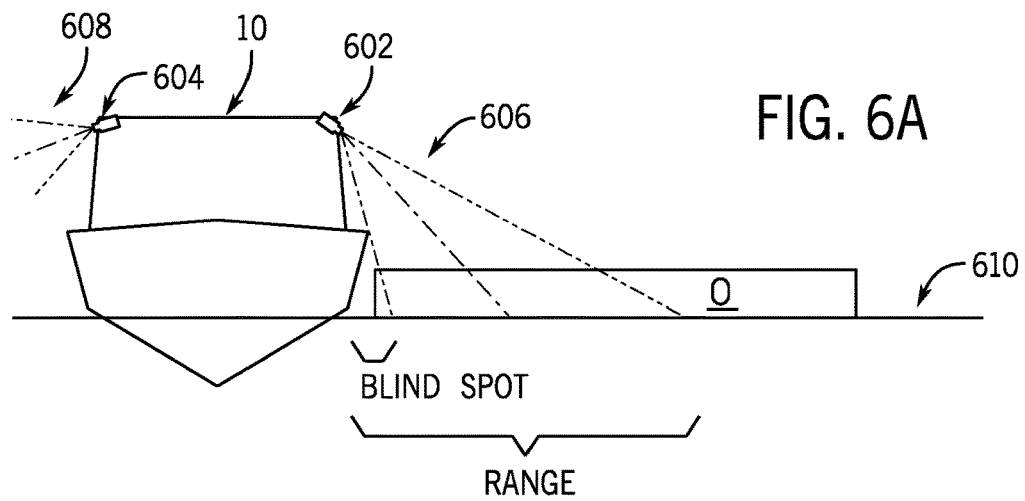
FIG. 6A shows an example of a partial field of view of a vision system of a marine vessel adjusted to include an object that the marine vessel is approaching in accordance with some embodiments of the disclosure.
Figure 6B:
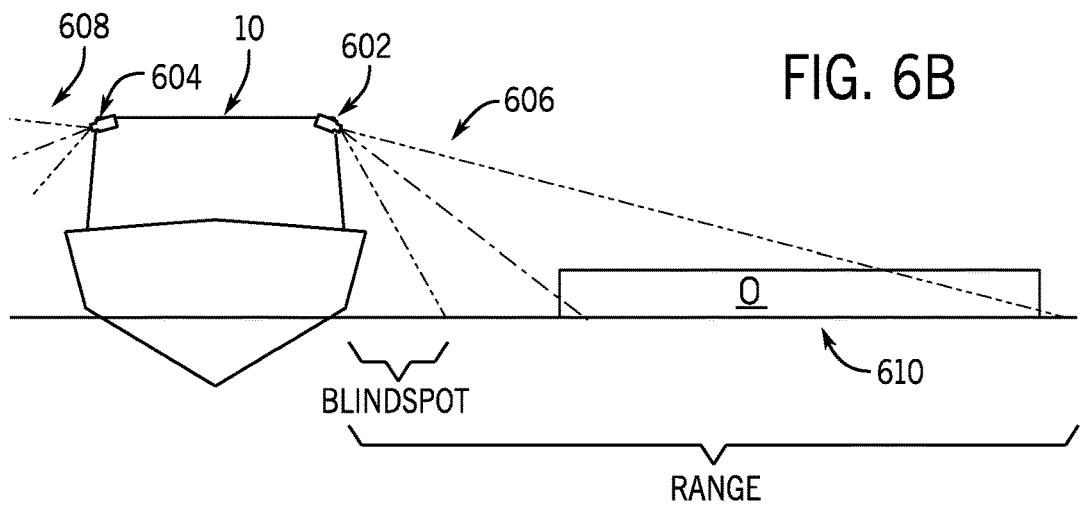
FIG. 6B shows an example of a partial field of view of a vision system of a marine vessel adjusted downward in accordance with some embodiments of the disclosure.
Figure 6C:
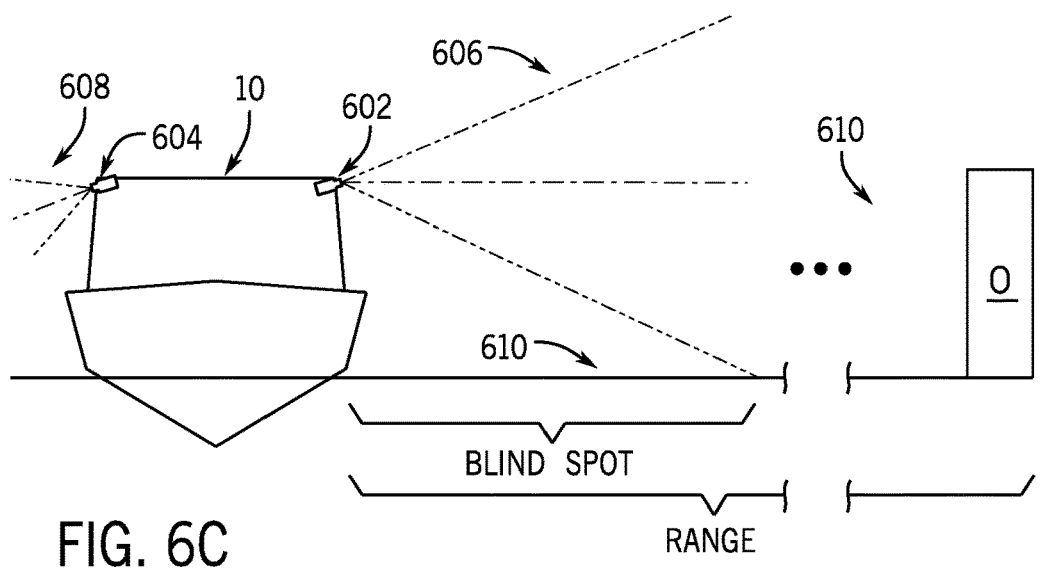
FIG. 6C shows an example of a partial field of view of a vision system of a marine vessel adjusted upward in accordance with some embodiments of the disclosure.

At 528, process 500 can tilt one or more cameras to a neutral position. In some embodiments, a neutral position can be a position that has a larger blind spot near the vessel than a FOV when the vessel is traveling at low speed or docking (e.g., as shown in FIGS. 6A and 6B), and a smaller blind spot near the vessel than a FOV when the vessel is traveling at high speed (e.g., as shown in FIG. 6C). In some embodiments, process 500 can omit 528. For example, cameras in the vision system can be operated to adjust to a current situation.

Figure 6D:
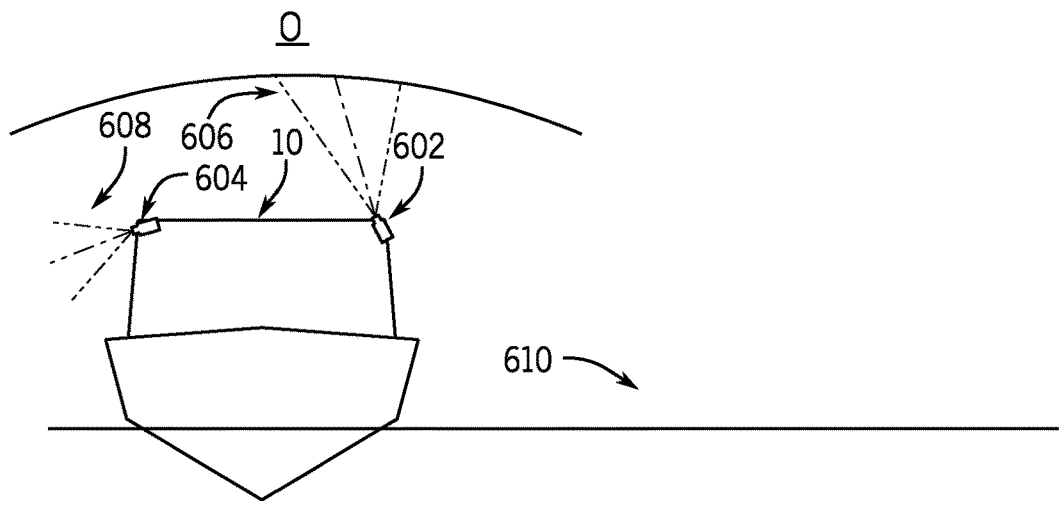
FIG. 6F shows an example of a partial field of view of a vision system of a marine vessel adjusted to include an overhead structure in accordance with some embodiments of the disclosure.
FIG. 6E shows an example of a partial field of view of a vision system of a marine vessel adjusted to include an operation console in accordance with some embodiments of the disclosure.
Figure 6E:
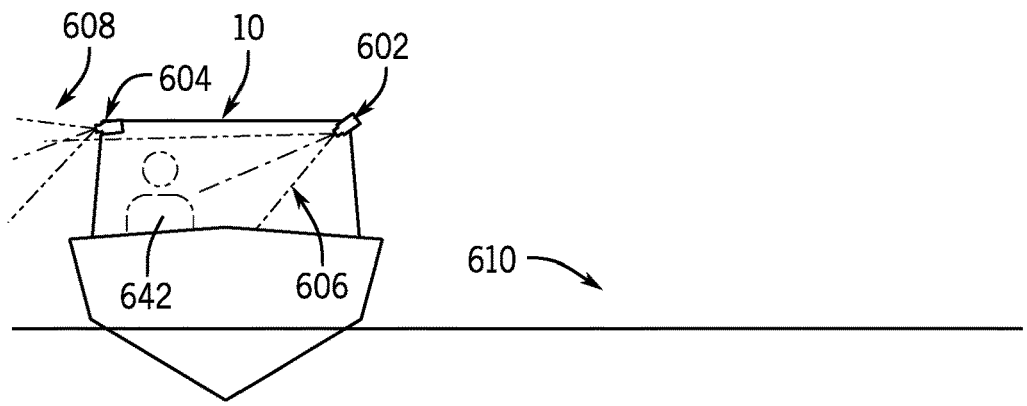

FIG. 6A shows an example of a partial field of view of a vision system of a marine vessel adjusted to include an object that the marine vessel is approaching in accordance with some embodiments of the disclosure. As shown in FIG. 6A, a vision system of marine vessel 10 can include camera 602 and camera 604, each having a respective FOV 606 and 608. In the example of FIG. 6A, a posture of camera 602 has been adjusted such that FOV 606 includes an area near vessel 10, which includes object O (e.g., a dock) that vessel 10 is approaching. Note that although camera 604 is shown in a relatively neutral pose (e.g., as shown in FIG. 6E) with FOV 608 relatively far from vessel 10, camera 604 (and any other cameras) can be in any other pose, such as pointed down (e.g., similar to the pose of camera 602) at an object near the opposite side of vessel 10 from object O, at an interior (e.g., as shown in FIG. 6E), at a lower angle (e.g., as shown in FIG. 6B), a higher angle (e.g., as shown in FIG. 6C), upward above vessel 10 (e.g., as shown in FIG. 6D).

As shown in FIG. 6A, a blind spot between a side of vessel 10 and FOV 606 can be relatively small, and a range (e.g., a farthest object that can be detected using camera 602) can also be relatively small. In the example of FIG. 6A, an optical axis of camera 602 can be deflected from level until (or past) where a gunwale of vessel 10 (or another part of vessel 10) blocks or would start blocking a portion of FOV 606, which can minimize the size of the blind spot of camera 606.

In some embodiments, camera 602 can be adjusted to an angle similar to the angle shown in FIG. 6A when vessel 10 is docking or otherwise very closely approaching an object (e.g., as described above in connection with 504 of FIG. 5). For example, it can be advantageous to minimize a size of a blind spot when docking such that a relatively accurate location of object O is with respect to vessel 10 can be determined, such that a collision with object O can be avoided while moving into an appropriate docking position.

FIG. 6B shows an example of a partial field of view of a vision system of a marine vessel adjusted downward in accordance with some embodiments of the disclosure. As shown in FIG. 6B, a posture of camera 602 has been adjusted such that FOV 606 includes an area relatively close to vessel 10, which includes part of object O (e.g., a dock) near vessel 10. As described above, although camera 604 is shown in a relatively neutral pose with FOV 608 relatively far from vessel 10, camera 604 (and any other cameras) can be in any other pose, such as pointed down (e.g., similar to the pose of camera 602) at an object approaching the opposite side of vessel 10 from object O, at an interior of the vessel, at a similar lower angle to camera 602, at a higher angle, upward above vessel 10, etc.

As shown in FIG. 6B, a blind spot between a side of vessel 10 and FOV 606 can be larger than in FIG. 6A while remaining relatively small, and a range (e.g., a farthest object that can be detected using camera 602) can also be relatively small while being larger than the range in FIG. 6A. In the example of FIG. 6B, an optical axis of camera 602 can be deflected between level and straight down, such that FOV 606 includes an area around vessel 10.

In some embodiments, camera 602 can be adjusted to an angle similar to the angle shown in FIG. 6B when vessel 10 is travelling at relatively low speed (e.g., as described above in connection with 506 of FIG. 5). For example, vessel 10 can travel at relatively low speed in a relatively congested area (e.g., a marina). As another example, vessel 10 can travel at relatively low speed when in proximity to a high risk object. As yet another example, vessel 10 can travel at relatively low speed when in an area in which speed is restricted (e.g., a no wake area). In such examples, there may be many and/or important objects relatively close to vessel 10, and it can be advantageous to reduce a size of a blind spot, while maintaining a larger range than when docking.

FIG. 6C shows an example of a partial field of view of a vision system of a marine vessel adjusted upward in accordance with some embodiments of the disclosure. As shown in FIG. 6C, a posture of camera 602 has been adjusted such that FOV 606 includes an area relatively far from vessel 10, which includes part of object O (e.g., another vessel) far from vessel 10. As described above, although camera 604 is shown in a relatively neutral pose with FOV 608 relatively far from vessel 10, camera 604 (and any other cameras) can be in any other pose.

As shown in FIG. 6C, a blind spot between a side of vessel 10 and FOV 606 can be relatively large in comparison to FIGS. 6A and 6B (e.g., on an order of several meters from vessel 10), and a range can also be relatively large. In the example of FIG. 6C, an optical axis of camera 602 can be relatively close to level, such that FOV 606 includes an area far from vessel 10.

In some embodiments, camera 602 can be adjusted to an angle similar to the angle shown in FIG. 6C when vessel 10 is travelling at high speed, is on plane (e.g., as described above in connection with 512 of FIG. 5), when anchored (e.g., as described above in connection with 516 of FIG. 5), etc. For example, vessel 10 can travel at relatively high speed and/or is on plane in a relatively sparsely occupied area (e.g., open water), in which there are few objects near vessel 10, and objects that are likely to present a collision risk in an upcoming time period are likely to be relatively far from vessel 10. As another example, when vessel 10 is anchored, objects that are likely to present a collision risk that can be avoided (e.g., by maneuvering vessel 10 from the currently anchored position) in an upcoming time period are likely to be relatively far from vessel 10 (e.g., travelling at relatively high speed toward vessel 10). In such examples, objects that may cause a dangerous situation (e.g., a collision, a high risk object) can be expected to be relatively far from vessel 10, and it can be advantageous to increase object detection accuracy relatively far from vessel 10 (e.g., by including the entire object in the FOV, rather than a portion of the object).

FIG. 6D shows an example of a partial field of view of a vision system of a marine vessel adjusted to include an overhead structure in accordance with some embodiments of the disclosure. As shown in FIG. 6D, a posture of camera 602 has been adjusted such that FOV 606 includes at least a portion of an overhead structure O under which vessel 10 is moving. As described above, although camera 604 is shown in a relatively neutral pose with FOV 608 relatively far from vessel 10, camera 604 (and any other cameras) can be in any other pose, including also adjusted to view overhead object O.

As shown in FIG. 6D, FOV 606 can be adjusted such that it includes no area around vessel 10. In some embodiments, another camera(s) can include an area around vessel 10. For example, cameras pointed toward a side or rear of vessel 10 can be used to view an area above vessel, including overhead object O and any protrusions from vessel 10, while a camera(s) with a view that includes a portion in front of vessel 10 (e.g., forward of a bow of vessel 10) can be used to view areas near vessel 10 on either side. In the example of FIG. 6D, an optical axis of camera 602 can be deflected from level until an underside of overhead object O above vessel 10 (and/or a highest point of vessel 10 and/or objects protruding from vessel 10) is within FOV 606.

In some embodiments, camera 602 can be adjusted to an angle similar to the angle shown in FIG. 6D when vessel 10 is approaching an overhead object and/or is moving beneath an overhead object (e.g., as described above in connection with 520 of FIG. 5). For example, a water level can change with respect to overhead object O (e.g., if a height of object O can be obtained from a database or chart), such as due to tides, variations in water level related to weather and/or seasonal changes, changes in water level in a lock, etc. As another example, a position of overhead object O with respect to a water level can change (e.g., for a draw bridge, deterioration in a condition of the object, etc.). In such examples, affirmatively determining whether vessel 10 and/or objects protruding from vessel 10 can clear the overhead object with a sufficient margin can be advantageous to reduce a risk of vessel 10 objects protruding from vessel 10 colliding with an overhead object.

FIG. 6E shows an example of a partial field of view of a vision system of a marine vessel adjusted to include an operation console in accordance with some embodiments of the disclosure. As shown in FIG. 6E, a posture of camera 602 has been adjusted such that FOV 606 includes at least a portion of an interior of vessel 10. As described above, although camera 604 is shown in a relatively neutral pose with FOV 608 relatively far from vessel 10, camera 604 (and any other cameras) can be in any other pose, including also adjusted to view an interior of vessel 10.

As shown in FIG. 6E, FOV 606 can be adjusted such that it includes no area on the same side of vessel 10 as camera 602. In some embodiments, another camera(s) can be include an area around vessel 10. For example, cameras pointed toward a side or rear of vessel 10 can be used to view an area within vessel 10 vessel, potentially including an operator 642 and/or other occupant, while a camera(s) with a view that includes other portions of the environment can be used to monitor areas around vessel 10. In the example of FIG. 6E, an optical axis of camera 602 can be deflected such that FOV 606 includes at least a portion inside of vessel 10 (e.g., an area from which vessel 10 can be operated, such as an area in front of operation console 22).

In some embodiments, camera 602 can be adjusted to an angle similar to the angle shown in FIG. 6E when an operator, occupant, and/or interior of vessel 10 is to be monitored for security and/or safety (e.g., as described above in connection with 524 of FIG. 5). For example, it can be advantageous to monitor an operator to determine whether the operator is at an operation console, whether an operator is alert and/or attentive, whether an unauthorized person has boarded vessel 10 when it is secured, etc.

Figure 6F:
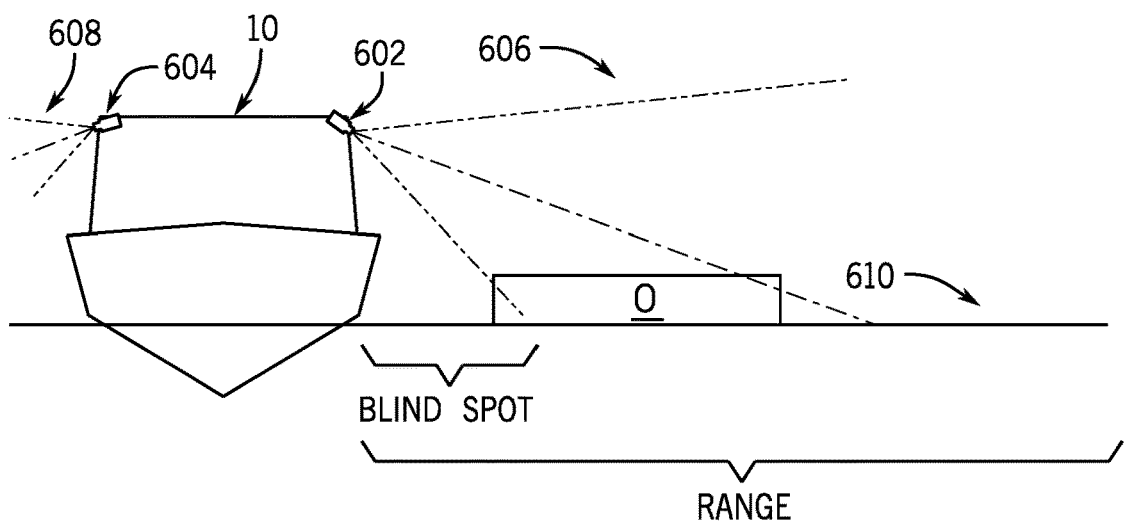

FIG. 6F shows an example of a partial field of view of a vision system of a marine vessel adjusted to a relatively neutral position in accordance with some embodiments of the disclosure. As shown in FIG. 6F, a posture of camera 602 has been adjusted such that FOV 606 includes an that includes areas relatively close to vessel 10 and areas relatively far from vessel 10, which can include part of object O relatively close to (e.g., a dock) to vessel 10, and objects relatively far from vessel 10. As described above, although camera 604 is shown in a relatively neutral pose with FOV 608 relatively far from vessel 10, camera 604 (and any other cameras) can be in any other pose.

As shown in FIG. 6F, a blind spot between a side of vessel 10 and FOV 606 can be larger than the blind spot in FIGS. 6A and 6B, and smaller than the blind sport in FIG. 6C, with a longer range than the range in FIGS. 6A and 6B, and may exclude some objects or portions of objects at long range than in FIG. 6C. In the example of FIG. 6F an optical axis of camera 602 can be deflected from level by a relatively small angle (e.g., about 15 to about 25 degrees from level), which can balance near and far FOV of camera 602. Alternatively, in some embodiments, a neutral position can be deflected from level by another angle, which can strike a different balance between near and far FOV (e.g., at a larger angle, such as in a range of about 25 to 40 degrees from level, or at a smaller angle, such as in a range of about 0 to about 40 degrees from level).

In some embodiments, camera 602 can be adjusted to an angle similar to the angle shown in FIG. 6F when vessel 10 is travelling at an intermediate speed and/or in a less congested area, but is not on plane and/or when no trigger condition is detected (e.g., as described above in connection with 528 of FIG. 5).

FURTHER EXAMPLES HAVING A VARIETY OF FEATURES

Implementation examples are described in the following numbered clauses:

1. A method for adjusting a field of view (FOV) of a vision system on a marine vessel, comprising: identifying a trigger condition for adjusting the FOV of a camera, wherein the camera is configured to be adjustably mounted to the marine vessel with an associated FOV of an environment of the marine vessel, and wherein the camera is associated with a three-dimensional camera coordinate system; adjusting a posture of the camera from an initial posture to an adjusted posture based on identification of the trigger condition, such that the camera has an adjusted FOV relative to the marine vessel; and determining three-dimensional location information associated with an object in the adjusted FOV in a three-dimensional global coordinate system associated with the marine vessel based on an adjusted transform between the camera coordinate system and the global coordinate system.

2. The method of clause 1, further comprising: receiving, while the camera is in the adjusted posture, image data captured by the camera; determining three-dimensional location information associated with the object in the camera coordinate system; and determining the three-dimensional location information associated with the object in the three-dimensional global coordinate system associated with the marine vessel using the adjusted transform and the three-dimensional location information associated with the object in the camera coordinate system.

3. The method of clause 2, further comprising: receiving, while the camera is in the initial posture with an initial FOV, image data captured by the camera; determining three-dimensional location information associated with one or more objects in the initial FOV in the camera coordinate system based on the image data captured while the camera is in the initial posture; and determining three-dimensional location information associated with the one or more objects in the three-dimensional global coordinate system using an initial transform and the three-dimensional location information associated with the one or more objects in the camera coordinate system.

4. The method of any one of clauses 1 to 3, further comprising: determining the adjusted transform based on an initial transform between the camera coordinate system and the global coordinate system and information indicative of a change in FOV of the camera between the initial posture and the adjusted posture, wherein the initial transform is associated with the initial posture.

5. The method of clause 4, further comprising: receiving, from one or more sensors, information indicative of a tilt angle of the camera in the adjusted posture, wherein the information indicative of the change in FOV of the camera comprises a tilt angle of the camera in the adjusted posture.

6. The method of any one of clauses 1 to 5, further comprising: adjusting a tilt angle of the camera about a horizontal axis, such that the posture of the camera is adjusted from the initial position to the adjusted position, wherein the horizontal axis is orthogonal to a depth axis of the camera.

7. The method of any one of clauses 1 to 6, further comprising: receiving, from a sensor mechanically coupled to the camera, a value indicative of a tilt angle of the camera about a horizontal axis.

8. The method of any one of clauses 1 to 6, wherein the camera is mechanically coupled to a rotatable mounting bracket.

9. The method of clause 8, wherein the rotatable mounting bracket is mechanically coupled to a motor, the method further comprising: in response to identification of the trigger condition, driving the motor, thereby causing rotation of the rotatable mounting bracket about an axis such that the camera is adjusted from the initial posture to the adjusted posture.

10. The method of clause 9, wherein the axis is aligned with an edge of the camera, and is orthogonal to a depth axis of the camera.

11. The method of clause 9, wherein the axis is a center axis of the camera, and is orthogonal to a depth axis of the camera.

12. The method of any one of clauses 1 to 11, wherein the trigger condition is one trigger condition of a plurality of trigger conditions, each of the plurality of trigger conditions is associated with a respective camera posture.

13. The method of clause 12, wherein the plurality of trigger conditions comprises a first trigger condition corresponding to a determination that the marine vessel is docking, and wherein the first trigger condition is associated with a camera posture tilted down at a first angle, such that a blind spot between a hull of the marine vessel and an edge of the FOV is minimized.

14. The method of clause 12, wherein the plurality of trigger conditions comprises a second trigger condition corresponding to a determination that the marine vessel is on plane, and wherein the second trigger condition is associated with a camera posture tilted at a second angle, such that a depth axis of the camera is substantially parallel to a horizontal axis of the marine vessel.

15. The method of clause 12, wherein the plurality of trigger conditions comprises a third trigger condition corresponding to a determination that the marine vessel is expected to travel under an overhead structure, and wherein the third trigger condition is associated with a camera posture tilted up at a third angle, such that at least a portion of an underside of the overhead structure is expected to be within the FOV.

16. The method of clause 12, wherein the plurality of trigger conditions comprises a fourth trigger condition corresponding to a determination that an interior of the marine vessel is to be monitored, and wherein the fourth trigger condition is associated with a camera posture tilted at a fourth angle, such that at least a portion of an area from which an operation console of the marine vessel is accessible is within the FOV.

17. The method of any one of clauses 1 to 16, wherein the camera comprises a stereoscopic camera.

18. A system comprising: one or more processors configured to: perform a method of any one of clauses 1 to 17.

19. A non-transitory computer-readable medium storing computer-executable code, comprising code for causing a computer to cause a processor to: perform a method of any of one of clauses 1 to 17.

In some embodiments, any suitable computer readable media can be used for storing instructions for performing functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that above-described steps of the processes of FIGS. 4 and 5 can be executed or performed in any suitable order or sequence not limited to the order and sequence shown and described in the figures. Also, some of the above steps of the processes of FIGS. 4 and 5 can be executed or performed substantially simultaneously where appropriate or in parallel to reduce latency and processing times.

This written description uses examples to disclose the invention(s), including the best mode, and also to enable any person skilled in the art to make and use the invention(s). Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention(s) is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for adjusting a field of view (FOV) of a vision system on a marine vessel, the system comprising:
   a camera,
     wherein the camera is configured to be adjustably mounted to the marine vessel with an associated FOV of an environment of the marine vessel, and
     wherein the camera is associated with a three-dimensional camera coordinate system; and
   one or more hardware processors configured to:
     identify a trigger condition for adjusting the FOV of the camera;
     adjust a posture of the camera from an initial posture to an adjusted posture based on identification of the trigger condition, such that the camera has an adjusted FOV relative to the marine vessel; and
     determine three-dimensional location information associated with an object in the adjusted FOV in a three-dimensional global coordinate system associated with the marine vessel based on an adjusted transform between the camera coordinate system and the global coordinate system.

2. The system of claim 1, wherein the one or more hardware processors are further configured to:
   receive, while the camera is in the adjusted posture, image data captured by the camera;
   determine three-dimensional location information associated with the object in the camera coordinate system; and
   determine the three-dimensional location information associated with the object in the three-dimensional global coordinate system associated with the marine vessel using the adjusted transform and the three-dimensional location information associated with the object in the camera coordinate system.

3. The system of claim 2, wherein the one or more hardware processors are further configured to:

receive, while the camera is in the initial posture with an initial FOV, image data captured by the camera;

determine three-dimensional location information associated with one or more objects in the initial FOV in the camera coordinate system based on the image data captured while the camera is in the initial posture; and determine three-dimensional location information associated with the one or more objects in the three-dimensional global coordinate system using an initial transform and the three-dimensional location information associated with the one or more objects in the camera coordinate system.

4. The system of claim 1, wherein the one or more hardware processors are further configured to:

determine the adjusted transform based on an initial transform between the camera coordinate system and the global coordinate system and information indicative of a change in FOV of the camera between the initial posture and the adjusted posture,
wherein the initial transform is associated with the initial posture.

5. The system of claim 4, wherein the one or more hardware processors are further configured to:

receive, from one or more sensors, information indicative of a tilt angle of the camera in the adjusted posture,
wherein the information indicative of the change in FOV of the camera comprises a tilt angle of the camera in the adjusted posture.

6. The system of claim 1, wherein the one or more hardware processors are further configured to:

adjust a tilt angle of the camera about a horizontal axis, such that the posture of the camera is adjusted from the initial position to the adjusted position,
wherein the horizontal axis is orthogonal to a depth axis of the camera.

7. The system of claim 1, further comprising:

a sensor mechanically coupled to the camera, wherein the sensor is configured to output a value indicative of a tilt angle of the camera about a horizontal axis, and wherein the one or more hardware processors are further configured to:
receive, from the sensor, the value indicative of the tilt angle of the camera about the horizontal axis.

8. The system of claim 1, further comprising:

a rotatable mounting bracket mechanically coupled to the camera.

9. The system of claim 8, further comprising:

a motor mechanically coupled to the rotatable mounting bracket, wherein the one or more hardware processors are further configured to:
in response to identification of the trigger condition, drive the motor, thereby causing rotation of the rotatable mounting bracket about an axis such that the camera is adjusted from the initial posture to the adjusted posture.

10. The system of claim 9, wherein the axis is aligned with an edge of the camera, and is orthogonal to a depth axis of the camera.

11. The system of claim 9, wherein the axis is a center axis of the camera, and is orthogonal to a depth axis of the camera.

12. The system of claim 1, wherein the trigger condition is one trigger condition of a plurality of trigger conditions, each of the plurality of trigger conditions is associated with a respective camera posture.

13. The system of claim 12, wherein the plurality of trigger conditions comprises a first trigger condition corresponding to a determination that the marine vessel is docking, and wherein the first trigger condition is associated with a camera posture tilted down at a first angle, such that a blind spot between a hull of the marine vessel and an edge of the FOV is minimized.

14. The system of claim 12, wherein the plurality of trigger conditions comprises a second trigger condition corresponding to a determination that the marine vessel is on plane, and
wherein the second trigger condition is associated with a camera posture tilted at a second angle, such that a depth axis of the camera is substantially parallel to a horizontal axis of the marine vessel.

15. The system of claim 12, wherein the plurality of trigger conditions comprises a third trigger condition corresponding to a determination that the marine vessel is expected to travel under an overhead structure, and
wherein the third trigger condition is associated with a camera posture tilted up at a third angle, such that at least a portion of an underside of the overhead structure is expected to be within the FOV.

16. The system of claim 12, wherein the plurality of trigger conditions comprises a fourth trigger condition corresponding to a determination that an interior of the marine vessel is to be monitored, and
wherein the fourth trigger condition is associated with a camera posture tilted at a fourth angle, such that at least a portion of an area from which an operation console of the marine vessel is accessible is within the FOV.

17. The system of claim 1, wherein the camera comprises a stereoscopic camera.

18. A method for adjusting a field of view (FOV) of a vision system on a marine vessel, comprising:

identifying a trigger condition for adjusting the FOV of a camera,
wherein the camera is configured to be adjustably mounted to the marine vessel with an associated FOV of an environment of the marine vessel, and
wherein the camera is associated with a three-dimensional camera coordinate system;

adjusting a posture of the camera from an initial posture to an adjusted posture based on identification of the trigger condition, such that the camera has an adjusted FOV relative to the marine vessel; and determining three-dimensional location information associated with an object in the adjusted FOV in a three-dimensional global coordinate system associated with the marine vessel based on an adjusted transform between the camera coordinate system and the global coordinate system.

19. The method of claim 18, further comprising:

receiving, while the camera is in the adjusted posture, image data captured by the camera;

determining three-dimensional location information associated with the object in the camera coordinate system; and determining the three-dimensional location information associated with the object in the three-dimensional global coordinate system associated with the marine vessel using the adjusted transform and the three-dimensional location information associated with the object in the camera coordinate system.

20. The method of claim 19, further comprising:

receiving, while the camera is in the initial posture with an initial FOV, image data captured by the camera;

determining three-dimensional location information associated with one or more objects in the initial FOV in the camera coordinate system based on the image data captured while the camera is in the initial posture; and determining three-dimensional location information associated with the one or more objects in the three-dimensional global coordinate system using an initial transform and the three-dimensional location information associated with the one or more objects in the camera coordinate system.

* * * * *